US009690690B1

(12) United States Patent
Henriksen

(10) Patent No.: US 9,690,690 B1
(45) Date of Patent: Jun. 27, 2017

(54) SCALABLE TRANSITIVE VIOLATION MATCHING

(71) Applicant: SEMMLE LIMITED, Oxford (GB)

(72) Inventor: Anders Starcke Henriksen, Oxford (GB)

(73) Assignee: Semmle Limited, Oxford (GB)

(*) Notice: Subject to any disclaimer, the term of this patent is extended or adjusted under 35 U.S.C. 154(b) by 0 days.

(21) Appl. No.: 15/282,714

(22) Filed: Sep. 30, 2016

(51) Int. Cl.
G06F 9/44 (2006.01)
G06F 11/36 (2006.01)
G06F 9/45 (2006.01)

(52) U.S. Cl.
CPC ............ *G06F 11/3692* (2013.01); *G06F 8/71* (2013.01)

(58) Field of Classification Search
CPC .... G06F 11/3692; G06F 11/3616; G06F 9/71; G06F 9/75; G06F 9/77
See application file for complete search history.

(56) References Cited

U.S. PATENT DOCUMENTS

| | | | |
|---|---|---|---|
| 5,860,011 A | 1/1999 | Kolawa et al. | |
| 7,647,579 B2 | 1/2010 | Drissi et al. | |
| 7,694,181 B2 | 4/2010 | Noller et al. | |
| 7,996,373 B1 | 8/2011 | Zoppas et al. | |
| 8,091,055 B2 | 1/2012 | Brelsford et al. | |
| 8,146,058 B2* | 3/2012 | Sarkar | G06F 8/10 717/101 |
| 8,214,798 B2* | 7/2012 | Bellucci | G06F 11/3616 702/186 |
| 8,336,030 B1 | 12/2012 | Boissy | |
| 8,356,278 B2 | 1/2013 | Drissi et al. | |
| 8,359,495 B2 | 1/2013 | Candea et al. | |
| 8,413,108 B2 | 4/2013 | Groves et al. | |
| 8,473,893 B2 | 6/2013 | Poole et al. | |
| 8,640,101 B2 | 1/2014 | Spurlin | |
| 9,208,056 B1 | 12/2015 | Henriksen et al. | |
| 9,262,157 B2* | 2/2016 | Henriksen | G06F 17/30106 |

(Continued)

OTHER PUBLICATIONS

Wulf-Hadash et al., Cross product line analysis, Jan. 2013, 8 pages.*

(Continued)

*Primary Examiner* — Thuy Dao
(74) *Attorney, Agent, or Firm* — Fish & Richardson P.C.

(57) ABSTRACT

Methods for reducing storage and performing static analysis on violations across code base revisions are disclosed. An example method begins with receiving a child snapshot representing a code base at a specific revision. A parent snapshot is identified. Then, canonical representations for violations representing coding defects in the parent and child snapshots are computed. An example method determines matching violations between the snapshots, unmatched parent violations, and unmatched child violations. For matching violations that have different canonical representations, a mapping between the parent snapshot violation and the child snapshot violation is stored using their respective canonical representations. For unmatched parent violations, each violation's canonical representation is stored with an indication that the violation has been eliminated from the child snapshot. For unmatched child violations, each violation's canonical representation is stored with an indication that the violation has been introduced in the child snapshot.

27 Claims, 20 Drawing Sheets

(56) References Cited

U.S. PATENT DOCUMENTS

| | | | |
|---|---|---|---|
| 9,305,279 B1 | 4/2016 | Menzel et al. | |
| 9,411,578 B2 | 8/2016 | Henriksen et al. | |
| 9,411,579 B2 | 8/2016 | Henriksen et al. | |
| 9,417,985 B2* | 8/2016 | Baars | G06F 11/3608 |
| 9,507,590 B2* | 11/2016 | Henriksen | G06F 11/3604 |
| 9,507,591 B2 | 11/2016 | Henriksen et al. | |
| 2004/0139370 A1 | 7/2004 | Bailey et al. | |
| 2005/0193216 A1 | 9/2005 | Gurda et al. | |
| 2006/0123389 A1 | 6/2006 | Kolawa et al. | |
| 2006/0206875 A1 | 9/2006 | Ullmann et al. | |
| 2008/0250398 A1 | 10/2008 | Takahashi et al. | |
| 2010/0017787 A1* | 1/2010 | Bellucci | G06F 11/366 717/111 |
| 2013/0019231 A1 | 1/2013 | Mangard et al. | |
| 2013/0055205 A1 | 2/2013 | Sereni et al. | |
| 2014/0149435 A1 | 5/2014 | Sisman et al. | |
| 2014/0201573 A1 | 7/2014 | Huang | |
| 2014/0297592 A1 | 10/2014 | Ohtake et al. | |
| 2014/0344788 A1 | 11/2014 | Rhoads | |
| 2015/0052108 A1 | 2/2015 | Volk et al. | |
| 2015/0193229 A1 | 7/2015 | Bansod et al. | |
| 2015/0309790 A1 | 10/2015 | Henriksen et al. | |
| 2015/0324195 A1 | 11/2015 | Henriksen et al. | |
| 2016/0098271 A1 | 4/2016 | Henriksen et al. | |
| 2016/0132326 A1 | 5/2016 | Henriksen et al. | |
| 2016/0140015 A1 | 5/2016 | Baars et al. | |
| 2016/0162288 A1 | 6/2016 | Henriksen et al. | |
| 2016/0162289 A1 | 6/2016 | Henriksen et al. | |
| 2016/0162388 A1 | 6/2016 | Henriksen et al. | |
| 2016/0203071 A1* | 7/2016 | Cai | G06F 11/3616 717/126 |

OTHER PUBLICATIONS

Palix et al., Tracking code patterns over multiple software versions with Herodotos, Mar. 2010, 12 pages.*

Corley et al., "Recovering traceability links between source code and fixed bugs via patch analysis," May 2001, 7 pages.

Palix et al., "Tracking Code Patterns Over Multiple Software Versions with Herodotos", 17. Proceedings of the Eighth International Conference on Aspect-Oriented Software Development, AOSD '10, Mar. 2010, pp. 169-180.

Sisman et al., "Incorporating version histories in information retrieval based bug localization," Jun. 2012, 10 pages.

Wang et al., "Version history, similar report, and structure: putting them together for improved bug localization," Jun. 2014, 11 pages.

Spacco et al., "Tracking defect warnings across versions," Proceedings of the 2006 International Workshop on Mining Software Repositories, MSR '06, May 22, 2005, pp. 133-136, XP055212551.

Extended European Search Report issued in European Application No. 15196029.1 on Mar. 9, 2016, 8 pages.

European Office Action for Application No. 15196029.1, dated Dec. 23, 2016, 5 pages.

Wikipedia, "Content-addressable storage," Wikipedia, the free encyclopedia, last modified on Nov. 27, 2015 [retrieved on Feb. 3, 2016]. Retrieved from the Internet: URL<https://en.wikipedia.org/wiki/Content-addressable_storage>, 4 pages.

Wikipedia, "Static program analysis," Wikipedia, the free encyclopedia, last modified on Jun. 6, 2016 [retrieved on Jul. 5, 2016]. Retrieved from the Internet: URL<https://en.wikipedia.org/wiki/Static_program_analysis>, 5 pages.

* cited by examiner

| Canonical Representation | Snapshot |
|---|---|
| 7a8b11:0 | S1 |
| 2e6f45 | S2 |
| 7a8b11:1 | S1 |
| 8e5c23 | S3 |
| 4d2a41 | S1 |
| 5a6d33 | S4 |
| ... | ... |
| 3e17a36 | S6 |

1710
1740
1750

Violation Introduction
Data Structure
FIG. 17A

| Canonical Representation | Snapshot |
|---|---|
| 7a8b11:0 | S3 |
| 2e6f45 | S4 |
| 4c5d16 | S4 |
| 3e6a46 | S7 |
| ... | ... |
| 8a8b14 | S10 |

1705
1755

Violation Elimination
Data Structure
FIG. 17B

| Canonical Representation | Canonical Representation |
|---|---|
| 7a8b11:1 | 4c5d16 |
| 4d2a41 | 3a8d71 |
| 5a6d33 | 3e6a46 |
| ... | ... |
| 3a8d71 | 8a8b14 |

1712
1742

Violation Mapping
Data Structure
FIG. 17C

| Canonical Representation | Canonical Representation | Snapshot | Indication Type | |
|---|---|---|---|---|
| 7a8b11:0 | | S1 | I | ⟵ 1800 |
| 2e6f45 | | S2 | I | |
| 7a8b11:1 | | S1 | I | |
| 8e5c23 | | S3 | I | ⟵ 1815 |
| 4d2a41 | | S1 | I | ⟵ 1820 |
| 7a8b11:0 | | S3 | E | ⟵ 1825 |
| 7a8b11:1 | 4c5d16 | | M | |
| 2e6f45 | | S4 | E | |
| 5a6d33 | | S4 | I | |
| 4c5d16 | | S4 | E | |
| 3e7a36 | | S6 | I | |
| 5a6d33 | 3e6a46 | | M | |
| 4d2a41 | 3a8d71 | | M | ⟵ 1855 |
| 3e6a46 | | S7 | E | |
| ... | ... | ... | ... | |
| 3a8d71 | 8a8b14 | | M | ⟵ 1870 |
| 8a8b14 | | S10 | E | ⟵ 1875 |

FIG. 18

SCALABLE TRANSITIVE VIOLATION MATCHING

BACKGROUND

This specification relates to static analysis of computer software source code.

Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot includes the source code of files of the code base as the files existed at a particular point in time.

Snapshots stored in a version control system can be represented as a directed, acyclical revision graph. Each node in the revision graph represents a commit of the source code. A commit represents a snapshot as well as other pertinent information about the snapshot such as the author of the snapshot, and data about ancestor commits of the node in the revision graph. A directed edge from a first node to a second node in the revision graph indicates that a commit represented by the first node is a previous commit than a commit represented by the second node, and that no intervening commits exist in the version control system.

SUMMARY

This specification describes how a static analysis system can find matching violations between a snapshot S of a source code base and a snapshot T of the source code base. The snapshots are not necessarily adjacent in the revision graph. The system can then use the matching violations to attribute, to individual revisions, individual developers, or teams of developers, violations introduced and removed between the snapshots S and T. From the violations introduced and removed, the system can generate developer fingerprints that are characteristic of the tendency of individual developers to introduce and remove violations of certain types.

Particular embodiments of the subject matter described in this specification can be implemented so as to realize one or more of the following advantages. Violations being introduced and removed can be accurately attributed to developers. Violations can be matched between snapshots even when additional source code has been added and even when violations have been moved between source code files. Violations can also be attributed even for merge commits and in the presence of unanalyzable snapshots.

Violation attribution can be used to improve team performance by helping to analyze the progress of status of a project. Violation attribution can help guide the selection of developers for various training programs and team assignments. Violation attribution also gives general insight into the software engineering process. Violation attribution can guide code reviews by drawing attention to common violations introduced by team members. Team performance can further be improved by reducing the number of violations that are introduced and by increasing the number of violations that removed. The ability for developers to see precisely which violations they have introduced and removed can drive developer motivation and self improvement.

An example system that uses and stores canonical representations may be scalable for computing static analysis on very large code bases and/or many code bases at a given time. This system may provide scalable transitive matching violations in a cloud-computing environment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 17A is a block diagram of an example data storage structure for storing violation introduction data.

FIG. 17B is a block diagram of an example data storage structure for storing violation elimination data.

FIG. 17C is a block diagram of an example data storage structure for storing violation elimination data.

FIG. 18 is a block diagram of an example data storage structure for storing elimination, introduction, and mapping data in the same data structure.

Like reference numbers and designations in the various drawings indicate like elements.

DETAILED DESCRIPTION

Figure 1:
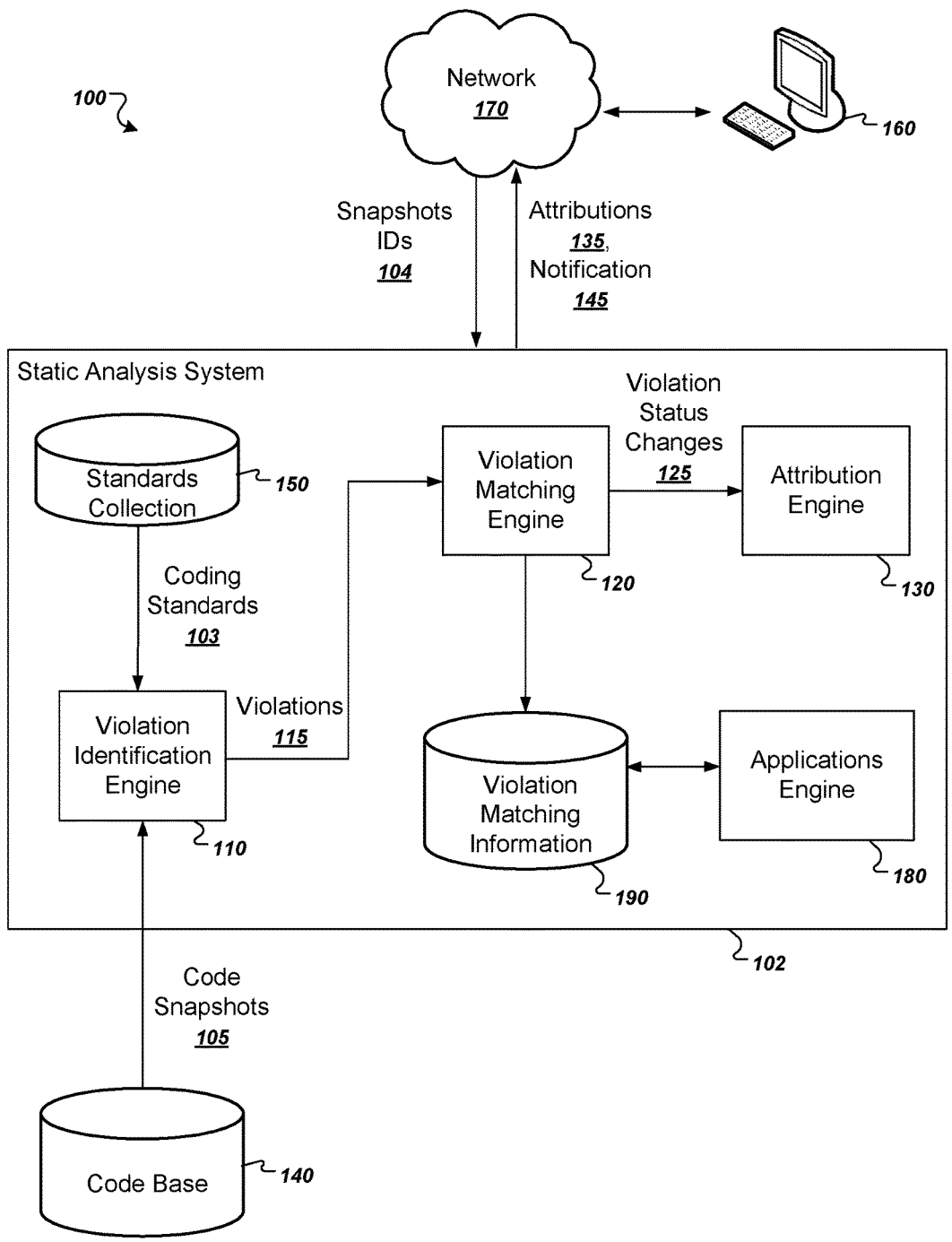
FIG. 1 illustrates an example system.

Static analysis can be performed on a code base, which may be referred to as a project. The project generally includes a collection of source code files organized in a particular way, e.g., arranged in a hierarchical directory structure, with each source code file in the project having a respective path.

Static analysis techniques include techniques for identifying violations of coding standards. In the systems described below, violations will be represented by data elements that will also be referred to simply as violations when the meaning is clear from context.

A static analysis system can use any appropriate set of coding standards for identifying violations, e.g., the NASA Jet Propulsion Laboratory Institutional Coding Standard for the Java Programming Language, available at http://lars lab.jpl.nasa.gov/JPL_Coding_Standard_Java.pdf. The types of violations that a static analysis system can identify include correctness standards on coding concurrent processes, maintainability standards on eliminating duplicate code segments, readability standards on reducing code complexity, and framework standards on using code libraries, to name just a few examples.

In Table 1, below, is an example segment of source code that contains a violation. The line numbers refer to line numbers of an example source code file.

127 Set<String>revs;
. . .
162 for (IRevision rev: new ArrayList<IRevision> (keep)){
163 if (!revs.contains(rev)){
. . .
179}
180}

TABLE 1

On line 127, the variable "revs" is declared to be of type "Set<String>". In other words, "revs" is a set of data elements that are character strings. On line 162, the variable "rev" is declared to be of type "IRevision."

On line 163, the source code checks whether the IRevision element "rev" is contained in the string set "revs." This requires a comparison between data elements that are strings and data elements that are of type "IRevision." Thus, the check on line 163 violates a coding standard that comparisons must only performed between variables of the same type. In fact, the check on line 163 will likely always return "false," and thus must be corrected by a developer in order for the program to operate correctly.

A violation data element for a violation in a project can include data representing a snapshot, S, a location, l, and a violation type, t. The location l will delineate the source code that violates the applicable coding standard. The source code that violates the standard, or "violation snippet," will generally be a contiguous segment of source code; however, in some cases, it may be two or more disconnected segments of source code and the location l will specify all of the corresponding segments. Similarly, the source code will generally be found in one source code file, but may be found in two or more source code files.

The location l of a particular source code violation can be specified by a path of a source code file that includes the particular violation, as well as a start position and an end position of the violation snippet or, if the violation snippet includes multiple segments of source code, multiple start positions and end positions of the multiple segments within the file. Typically, the start and end positions within a file are represented by starting and ending line numbers within the file as well as an offset within the line, e.g., a column number or an offset that specifies a number of characters or bytes. For example, a violation data element representing the example violation illustrated above would have a violation snippet "revs.contains(rev)", and a location l that specifies a path of the example file, a beginning line 163 with beginning offset 10, and an ending line 163 with ending offset 28. The start and end positions can also be given by a byte offset within the file as a whole. Additionally, rather than an absolute end position, the end position could be specified as an offset from the start position of the violation.

A violation data element also has a type that indicates what sort of violation the violation is. For example, a violation representing the example violation illustrated above would have a type that indicates that the violation snippet violates a coding standard that forbids comparing data elements that have different types.

Two violations match each other if they refer to the same defect in their respective code bases. In other words, a violation v in a first snapshot S matches a violation w in a second snapshot T if v refers to the same defect in the snapshot S as w does in the snapshot T. A static analysis system can determine which violations in S match those in T. Given a set V of violations in S, and a set W of violations in T, a static analysis system can determine a set M of violations in V that have a matching violation in W, and a set N of violations in W that have a matching violation in V. The static analysis system can further require that no two elements of M match the same violation in W, and that no two elements of N match the same violation in V. The static analysis system can also determine a set P of violations that occur in V but do not match any violation in W, and a second set Q of violations that occur in W but do not match any violation in V.

A static analysis system can determine status changes of violations in one particular snapshot relative to another snapshot. In this specification, reference will be made to determining status changes of violations by comparison between a first snapshot S and a second snapshot T The snapshot S may represent the source code files of the project at an earlier point in time than the snapshot T The snapshot S and the snapshot T may also have a parent/child relationship in a revision graph. A first snapshot is a "parent" of a second snapshot when a commit of the first snapshot is a parent in the revision graph of a commit of the second snapshot. Similarly, a first snapshot is a "child" of a second snapshot when a commit of the first snapshot is a child in the revision graph of a commit of the second snapshot.

However, snapshots being compared need not have any particular relationship at all. In fact, the snapshot T may represent an earlier snapshot of the project than the snapshot S. The snapshot S and the snapshot T may be illustrated as adjacent in a revision graph; however, this is not required.

Status changes include the introduction of violations that were introduced in the snapshot T relative to the snapshot S as well as the removal of violations that were removed from the snapshot S relative to the snapshot T. Generally, violations that were introduced in the snapshot T relative to S are violations that occur in the snapshot T but do not occur in the snapshot S. Conversely, violations that were removed from the snapshot S relative to T are violations that occur in the snapshot S but do not occur in the snapshot T.

In a common situation where the snapshot S and the snapshot T are from the same code base, and the snapshot S is a sole parent of the snapshot T in a revision graph, the set M represents the set of violations in S that were uncorrected in the code base between the snapshots S and T; the set P represents the set of violations in S that were removed from the code base in snapshot T; and, the set Q represents the set of violations that were introduced into the code base in snapshot T.

In this specification, the term "matching violation" may be used to refer to a violation in a snapshot S, a violation in a snapshot T, or to a pair of corresponding violations in the snapshots S and T, which will be apparent from the context.

Because pairs of matching violations represent the same coding defect, pairs of matching violations have the same type. However, matching violations may, but need not, have identical violation snippets. Similarly, matching violations may, but need not, occur at a same location within a file in the snapshot S and the snapshot T. Likewise, matching violations may, but need not, occur within a same file in the snapshot S and the snapshot T.

A static analysis system can attribute violation status changes to a particular snapshot or to a particular developer by determining which violations match each other. In the case described above, when S is a sole parent of T, the removal of the violations in P and the introduction of the violations in Q could be attributed to snapshot T, or to the developer or team of developers responsible for snapshot T. There are also other circumstances in which a set of violations may be attributed to a snapshot or to a developer, which will be described in more detail below. A "developer" in this context may actually refer to a group or team of developers responsible for the snapshot T.

After attributing violation status changes, the system can generate individual developer fingerprints that are representative of the types of violations typically introduced or removed by the developer. The system can use the fingerprints to analyze team performance, set goals, and guide improvement plans through training or team selection.

FIG. 1 illustrates an example system 100. The system 100 includes a user device 160 in communication with a static analysis system 102 over a network 170. The static analysis system 102 includes several functional components, including a violation identification engine 110, a violation matching engine 120, and an attribution engine 130, and an applications engine 180. The components of the static analysis system 102 can be implemented as computer programs installed on one or more computers in one or more locations that are coupled to each through a network.

A user of user device 160 can initiate static analysis of snapshots of the code base 140. The user device 160 can communicate with the static analysis system 102 over the network 170, which can be any appropriate communications network, e.g., an intranet or the Internet. For example, a user of user device 160 can specify snapshot identifiers 104 of two or more snapshots for analysis. Alternatively, the static analysis system 102 can be installed in whole or in part on the user device 160.

The user of user device 160 can also communicate with the static analysis system 102 in order to specify or customize the coding standards that define coding violations in a standards collection 150.

Upon the user of user device 160 specifying the snapshots 104 for static analysis, the violation identification engine 110 receives the selected snapshots 105 from the code base 140, e.g., a parent snapshot and a child snapshot.

The violation identification engine can then retrieve coding standards 103 from the standards collection 150 to identify violations 115 that occur in the snapshot S and the snapshot T. Alternatively, the violations 115 can be obtained from other sources.

The violation matching engine 120 receives data representing the violations 115 from the violation identification engine 110. The violation matching engine 120 determines which of the violations 115 are matching violations between the snapshot S and the snapshot T. In other words, the violating matching engine 120 determines pairs of the violations 115 that match between the snapshots.

The violation matching engine 120 then determines violation status changes 125, which relate to violations 115 that are not matching violations. In particular, the violation status changes 125 will generally include the introduction of violations into the snapshot T and the removal of violations from the snapshot S.

The violation matching engine 120 stores information in a collection of violation matching information 190. The collection 190 stores canonical representations of violations that reduce the amount of storage space required to record which violations matching each other. This process is described in more detail below with reference to FIG. 15.

The attribution engine 130 receives the violations status changes 125 from the violation matching engine 120 and attributes the violation status changes to a particular developer or to a particular snapshot. At this point, the static analysis system 102 can provide the attributions 135 of the violation status changes back to the user device 160, e.g., over the network 170.

An applications engine 180 can use the collection of violation matching information 190 to compute a variety of code base attributes 135. For example, the applications engine 180 can compute individual statistics for each violation, e.g., how long the violation existed in the code base 140, and aggregated statistics, e.g., an average length of time that a violation of a certain type existed in the code base 140. The application engine 180 can also compute developer-specific or team-specific statistics, e.g., which developers or teams introduced which violations currently outstanding in a code base, or how much time passed before developers or teams fixed coding defects, and which statistics can be used to rank or rate developers or teams. These processes are described in more detail below with reference to FIGS. 19-21.

In some implementations, the user of the system 102 can specify which particular code base attributes 135 should be computed by the applications engine 180. The applications engine 180 can compute the specified code base attributes 135 from the violation matching information 190 and provide the code base attributes 135 back to the user device 160 over the network 170.

Figure 2A:
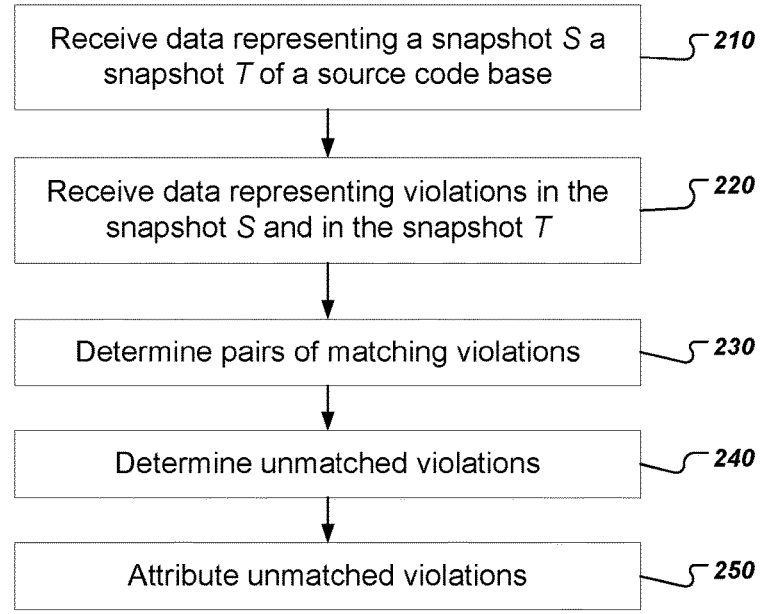
FIG. 2A is a flowchart of an example process for attributing violation status changes.

FIG. 2A is a flow chart of an example process for attributing violation status changes. The process can be implemented by one or more computer programs installed on one or more computers. The process will be described as being performed by an appropriately programmed system of one or more computers, e.g., the static analysis system 102 of FIG. 1.

In general, a static analysis system receives data identifying violations in a snapshot S and a snapshot T of a project. The system then determines matching violations and uses the matching violations to attribute violation status changes.

The system receives data representing a snapshot S and a snapshot T of a code base (210). The data includes data representing paths of source code files in each snapshot. The data may, but need not, include all of the actual source code of each snapshot.

The data representing the snapshots can include data about which files of the snapshot S correspond to files of the snapshot T For example, if some files from the snapshot S were moved to a new directory or simply renamed in the snapshot T, the data can include cross-reference data representing a correspondence of paths for files in the snapshot S and files in the snapshot T Two files having corresponding paths can be referred to as files having "matching paths." In some implementations, the system by default considers files to correspond if they have a same path in the snapshot S and in the snapshot T.

The system receives data representing violations in the snapshot S and in the snapshot T (220). The data representing the violations includes, for each violation, data representing a snapshot, a location, and a type. The data also includes the source code that corresponds to the violation.

In some implementations, the system determines the violations by analyzing source code from the snapshot S and the snapshot T However, the system may also receive the data representing the violations from another source, e.g., as uploaded by a user, or as generated by a separate static code analyzer.

The system determines pairs of matching violations (230), i.e., categorizes particular pairs of violations as matching each other. In general, the system can compare each violation in the snapshot S with each violation in the snapshot T having the same type using one or more matching tests to determine whether the violations are matching violations. Once a pair of violations are determined to be matching violations, the system need not subject the violations to additional tests and can remove the violations from consideration. In addition, the system performs some matching tests only on violations that occur in corresponding files in each snapshot.

Figure 2B:
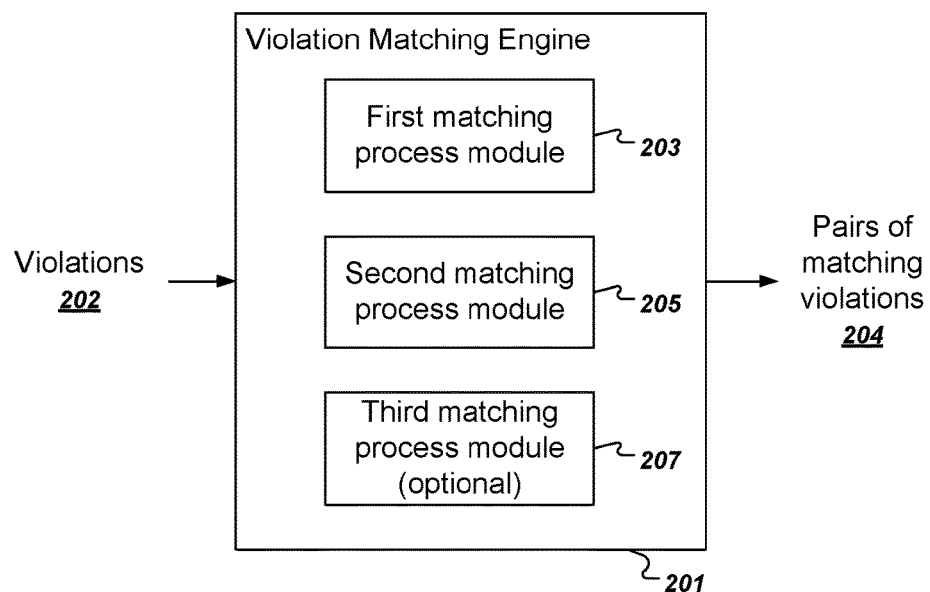
FIG. 2B is a block diagram of an example violation matching engine.

FIG. 2B is a block diagram of an example implementation 201 of a violation matching engine 120. This violation matching engine implementation 201 includes a first matching process module 203, a second matching process module 205, and an optional third matching process module 207. The violation matching engine implementation 201 receives violations 202 and generates pairs of matching violations 204. In some implementations, the violation matching engine 201 applies each violation matching process in sequence, with each subsequent process operating only on violations that have not yet been matched. The system can also perform the matching processes in different orders, or, alternatively, in parallel, in which case if any of the tests identifies two violations as matching violations, the two violations are included in the set of matching violations. Determining matching violations will be described in more detail below with reference to FIG. 4A.

The system determines unmatched violations (240), i.e., identifies violations that are not matching violations. The system determines both violations in the snapshot S that do not have a corresponding matching violation in the snapshot T as well as violations in the snapshot T that do not have a corresponding matching violation in the snapshot S. The unmatched violations are violations that correspond to a status change between the snapshot S and the snapshot T.

Figure 3:
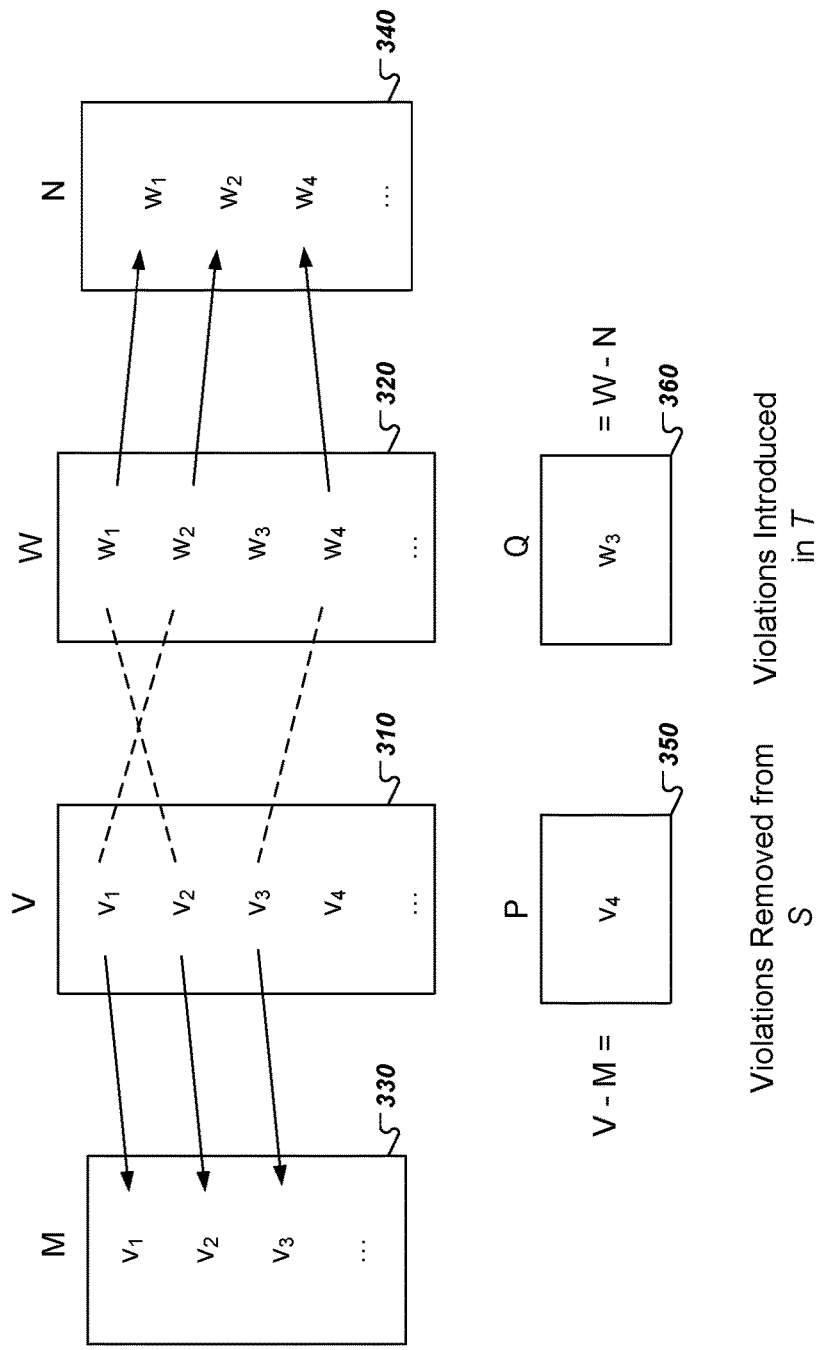
FIG. 3 illustrates determining unmatched violations.

FIG. 3 illustrates determining unmatched violations. In some implementations, the system maintains a set V 310 of violations in the snapshot S and a set W 320 of violations in the snapshot T The system then determines matching violations. In FIG. 3, matching violations between V and W are indicated by the dashed lines.

When a violation in S matches a violation in T, the system adds the violation in S to a set M 330 of matched violations in S. Similarly, when a violation in T matches a violation in S, the system adds the violation in T to a set N 340 of matched violations in T.

The system can then determine a set 350 of unmatched violations in S by computing a set difference P=V–M between the set V 310 and the set M 330. Likewise, the system can determine a set 360 of unmatched violations in T by computing a set difference Q=W–N between the set W 320 and the set N340.

In some implementations, the system removes matching violations from the set V 310 and from the set W 320 as the system finds the matching violations. Thus, after performing all the matching tests on all the violations, the altered set 17310 will be the set 350 of unmatched violations in S, and the altered set W 320 will be the set 360 of unmatched violations in T.

The system can also designate violations as matching violations in other ways. For example, the system can leave the set V 310 and the set W 320 the same but annotate each matching violation in S with a matching violation in T and vice versa.

As shown in FIG. 2A, the system attributes the unmatched violations to a revision or a developer or both (250). As described above, the unmatched violations in S may represent violations removed from the snapshot S, and the unmatched violations in T may represent violations introduced in the snapshot T.

The system can attribute a status change of an unmatched violation to a particular snapshot or to a particular developer or both. Typically, the system attributes status changes of violations to the snapshot T, or to the developer who was responsible for the snapshot T in the version control system. There are exceptions, which will be discussed in more detail with reference to FIGS. 9-13.

Figure 4A:
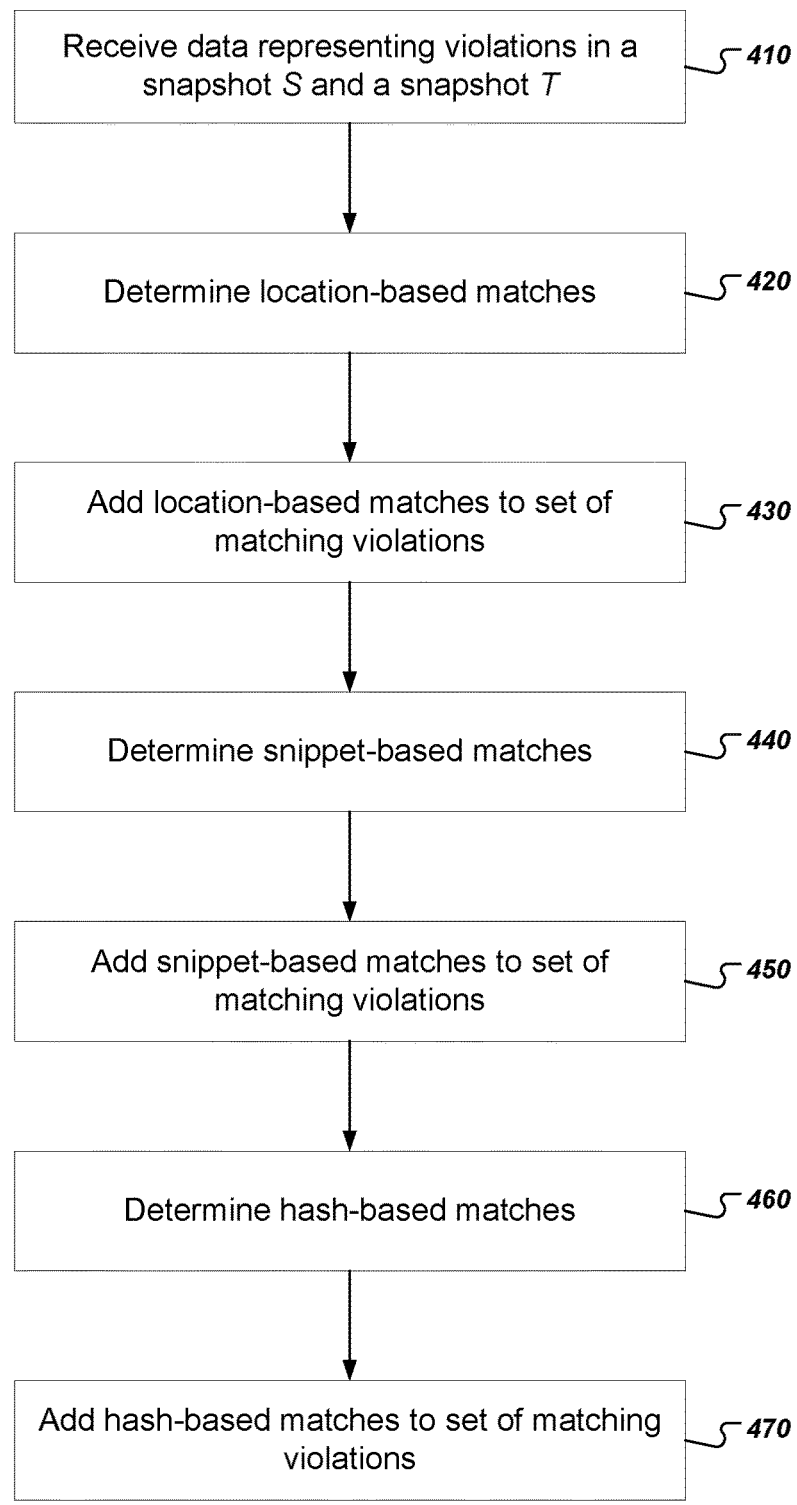
FIG. 4A is a flowchart of an example process for determining matching violations.

FIG. 4A is a flowchart of an example process for determining which violations match each other. The process can be implemented by one or more computer programs installed on one or more computers. The process will be described as being performed by an appropriately programmed system of one or more computers, e.g., the violation matching engine 120 of FIG. 1.

In general, a system receives data representing violations in a snapshot S and violations in a snapshot T The system then performs a number of pair-wise matching tests between the violations.

In the process as illustrated, the system performs three matching tests in succession. The system performs location-based matching tests, snippet-based matching tests, and hash-based matching tests. Thus, the system can analyze all violations using a particular family of matching tests before analyzing violations with a different family of matching tests. Optionally, the system can perform only two matching tests, or the process can perform more than two matching tests. The system can also perform the matching tests in a different order than the one illustrated, or, alternatively, in parallel, in which case if any of the tests identifies two violations as matching violations, the two violations are included in the set of matching violations. As violations are matched, the system adds the matching violations to sets of matching violations. Violations that are already designated as matching can be removed from further consideration by other matching tests. In addition, violations having different types need not be tested. In other words, the system can skip performing matching tests for violations having different types.

The system receives data representing violations in a snapshot S and violations in a snapshot T (410). As described above, each violation is represented at least by a type, and a location, which includes a path and starting and ending points of the violation delineating a segment of source code of the violation.

The system determines location-based matches (420). In general, two violations are a location-based match if they occur in corresponding files in each snapshot and occur at a same or a similar location within a pair of corresponding line ranges, as will now be described in more detail.

Figure 5:
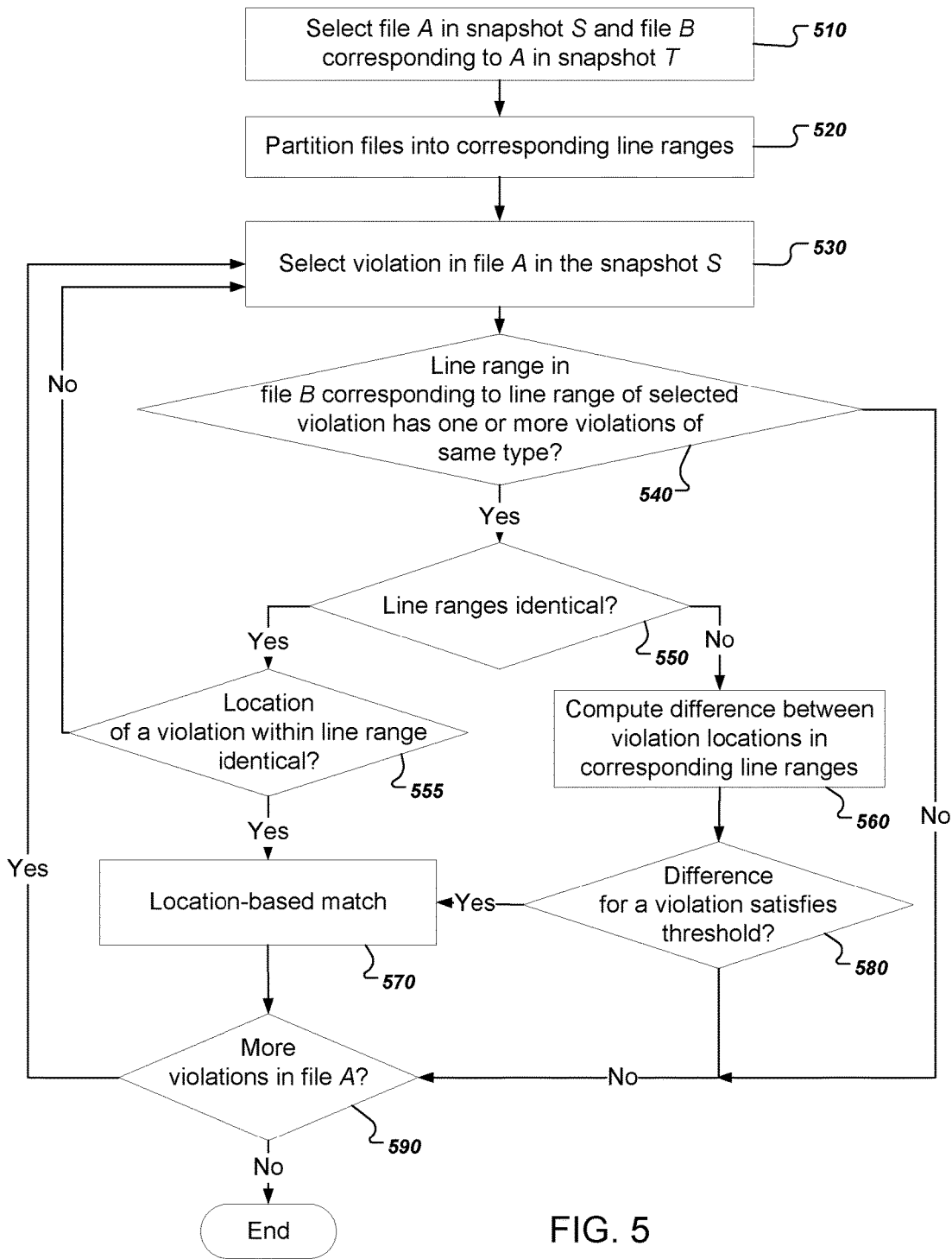
FIG. 5 is a flowchart of an example process for determining location based matches.

FIG. 5 is a flow chart of an example process for determining location-based matches. The process will be described as being performed by an appropriately programmed system of one or more computers, e.g., the violation matching engine 120 of FIG. 1.

The system selects a file A in the snapshot S and a file B that corresponds to A in the snapshot T(510). In some implementations, to be a location-based match, two violations must occur in files that correspond to each other in the snapshots. Thus, to select pairs of violations to compare, the system can first select a pair of corresponding files from the snapshot S and the snapshot T Thus, if a file in one snapshot does not have a corresponding file in the other snapshot, the system can skip the file. The system may also skip files if neither or only one of the corresponding files includes violations.

The system partitions the files into corresponding line ranges (520), i.e., line ranges that correspond with each other. In some implementations, the line ranges are non-overlapping.

The system can use any appropriate diffing algorithm to partition the files into corresponding line ranges. For example, the system can invoke a diffing method that performs the Myers diffing algorithm, which is described in more detail in Eugene W. Myers, *An O(ND) Difference Algorithm and Its Variations*, Algorithmica, 1 (2): 251-266, 1986, or one that performs the Hunt-Szymanski diffing algorithm, which is described in more detail in James W. Hunt and Thomas G. Szymanski, *A Fast Algorithm for Computing Longest Common Subsequences*, Communications of the ACM, 20(5), 1977.

In some implementations, the system dynamically chooses between the Myers diffing algorithm and the Hunt-Szymanski diffing algorithm. The system can compute a measure of identical lines between the files. If the measure satisfies a threshold, e.g., 90% identical, 95% identical, or 99% identical, the system chooses the Myers algorithm. Otherwise, the system chooses the Hunt-Szymanski algorithm.

Figure 6:
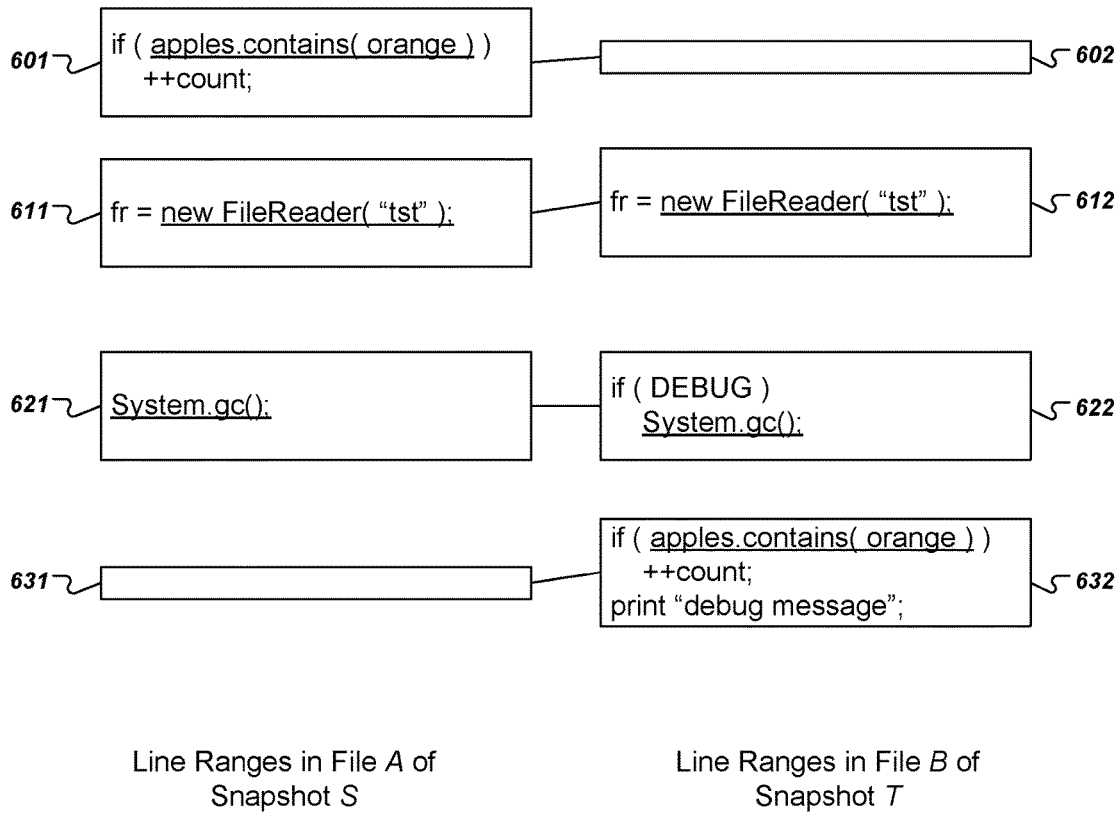
FIG. 6 illustrates files partitioned into corresponding line ranges.

FIG. 6 illustrates files partitioned into corresponding line ranges. The line ranges on the left are line ranges from the file in the snapshot S. The line ranges on the right are line ranges from the corresponding file in the snapshot T. In FIG. 6, the source code that is part of the violation, the violation snippets, are indicated by underlining. Although no line range in FIG. 6 contains more than one violation, this is not always the case. Some line ranges may contain multiple violations. In general, line ranges can contain zero or more violations.

The diffing algorithm outputs corresponding line ranges. The line range 601 corresponds to the line range 602, which is empty. The line range 611 corresponds to the line range 612. The line range 621 corresponds to the line range 622, and the line range 631 corresponds to the line range 632.

As shown in FIG. 5, the system selects a violation in file A in the snapshot S (530). The system can iterate over violations in the file A from the snapshot S, attempting to find matching violations in the file B from the snapshot T The selected violation will have a particular line range in the file A as determined by the diffing algorithm.

The system determines whether a line range in file B corresponding to the line range of the selected violation has one or more violations of the same type (540). If the corresponding line range does not have one or more violations of the same type, the system can select a next violation from the file A (branch to 590).

In FIG. 6, for example, the line range 601 has a violation, indicated by underlining. However, the line range 601 corresponds to the line range 602, which does not have a violation. Thus, the system can skip location-based matching for the line range 601 and the line range 602.

On the other hand, if the corresponding line range does have one or more violations of the same type, the system determines whether the corresponding line ranges are identical (branch to 550). For example, in FIG. 6, the line range 611 has a violation and corresponds to the line range 612 that does have a violation of the same type. Thus, the system can determine whether the line range 611 and the line range 612 are identical.

In general, the system considers violations that occur in corresponding line ranges to be location-based matches if the respective locations of the violations within the corresponding line ranges differ by a threshold amount or less. The threshold amount can be specified in terms of a number of lines or a number of characters, for example.

In some implementations, the threshold amount changes depending on whether the source code delineated by the corresponding line ranges is identical or not. If the line ranges are identical, the system can use a smaller threshold, e.g., zero lines or zero characters, than a threshold used when the line ranges are not identical, e.g., greater than zero lines or characters. For example, the system can use threshold for line ranges that are not identical that is one, three, or ten lines of code.

The system determines whether the corresponding line ranges are identical (550). For example, in FIG. 6, the line range 611 and the line range 612 are identical.

If the line ranges are identical, the system determines whether the locations of a violation within the line ranges are identical (branch to 555). In other words, the system determines whether the locations of the violations differ by a threshold set to zero characters or zero lines. As described above, a violation data element has location data that delimits code of the violation, e.g., a starting line and an ending line. The system can use the location data within a line range for a violation to determine whether the location of the violations within their respective line ranges is identical, e.g., a same starting line and ending line within the line range. In some implementations, the system requires column or byte offset data of the locations to also be identical between the two violations. In other words, the locations of the violation snippets must be identical character-by-character, and not merely identical line-by-line.

If the corresponding line range in file B has multiple violations of the same type, the system determines whether any of the multiple violations have an identical location within the line range.

If the location of the violations within their respective line ranges is identical, the system determines that the violation from the file A and the violation having the identical location is a location-based match (branch to 570). For violations that match, the system typically removes them from further consideration or matching analysis. The system then determines whether there are more violations in the file A (590).

If the line ranges were not identical (550), the system computes the difference between the locations of the violations within the corresponding line ranges (branch to 560). For example, the system can compute the difference between a starting line number of a violation within a line range of the file A and respective starting line numbers of one or more violations within the corresponding line range of the file B.

For example, in FIG. 6, the violation in the line range 621 starts on line 1 of the line range 621. The violation in the corresponding line range 622 starts on line 2 of the line range 612. Thus, the difference between the violation locations in the corresponding line ranges is one line.

As shown in FIG. 5, the system determines whether the difference for a violation satisfies a threshold (580). If the difference satisfies a threshold, e.g., is within a line or is less than two lines, three lines, or five lines, the system designates the pair of violations as a location-based match (branch to 570).

If none of the respective differences for the violations from the corresponding line range of file B satisfy the threshold, the system does not designate the violations as a location-based match and determines whether there are more violations in the file A for comparison (branch to 590). If so, the system selects a next violation in the file A (branch to 530). If not, the process ends. The system can then repeat the process shown in FIG. 5 for all pairs of corresponding files between the snapshot S and the snapshot T.

As shown in FIG. 4A, the system adds the location-based matches to a set of matching violations (430). As described above, the system can move the matching violations into sets of matching violations or otherwise designate the violations as matching.

If all violations have been analyzed using location-based matching tests, the system determines whether there are any snippet-based matches (440). In general, two violations are a snippet-based match if they occur in corresponding files between the snapshots and if they have identical violation snippets.

Figure 7:
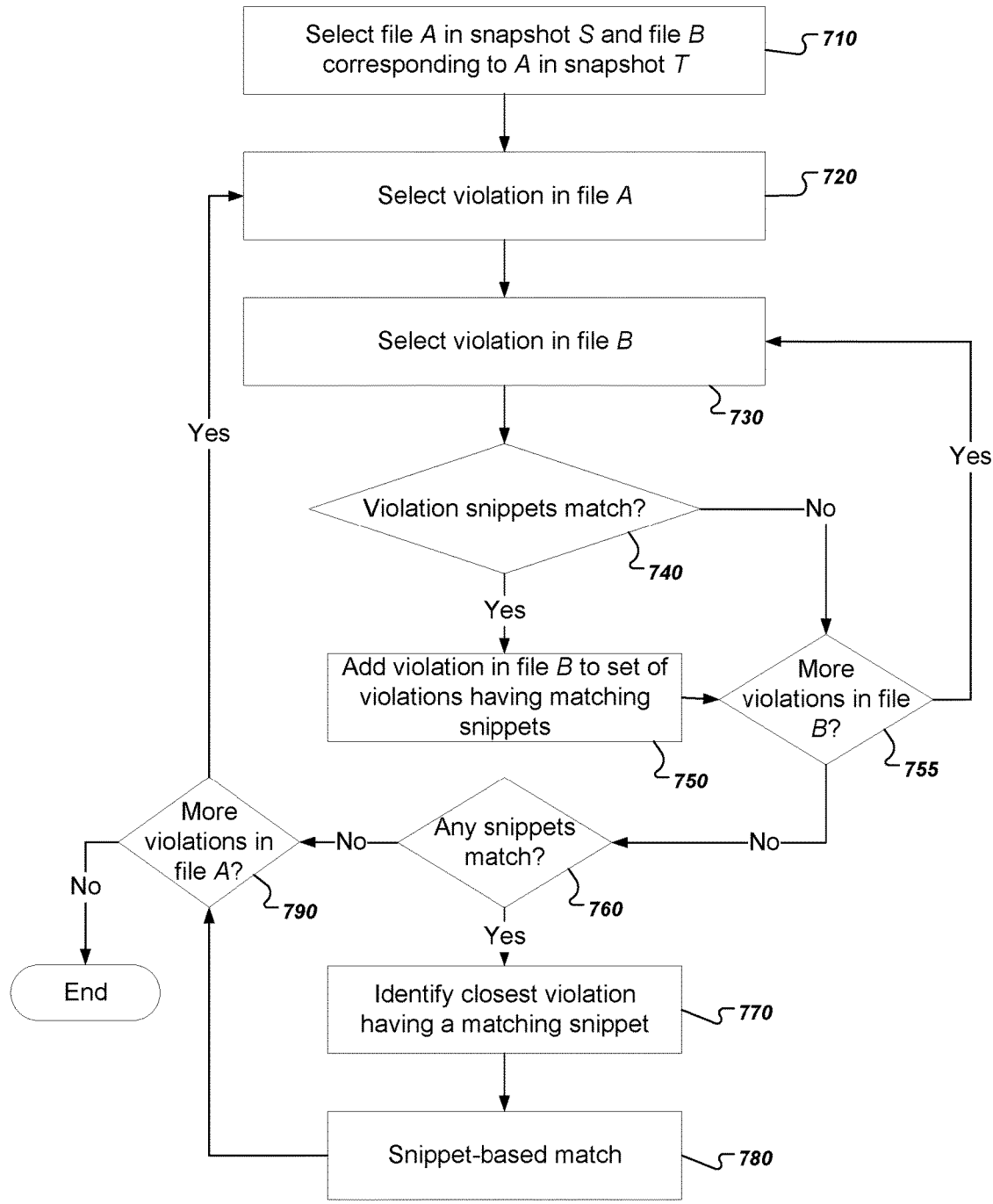
FIG. 7 is a flowchart of an example process for determining snippet based matches.

FIG. 7 is a flowchart of an example process for determining snippet-based matches. The process will be described as being performed by an appropriately programmed system of one or more computers, e.g., the violation matching engine 120 of FIG. 1.

The system selects a file A in the snapshot S and a file B corresponding to A in the snapshot T having a matching path (710). Thus, if a file in the snapshot S or the snapshot T does not have a corresponding file with a matching path in the other snapshot, the system can skip the file. The system may also skip corresponding pairs of files if neither or only one of the files includes violations.

The system selects a violation in the file A (720). As described above with reference to FIG. 5, the system can iterate over violations in the file A, comparing each violation in the file A to each other violation in the file B.

Thus, the system selects a violation in the file B (730).

The system determines whether the violation snippets match (740). In other words, the system compares the source code delimited by the location l of each selected violation to determine whether the violations can be a snippet-based match.

Violation snippets match if the source code delimited by the respective location l of the violations is identical. If the location l designates multiple segments of source code, the system can require that each of the corresponding segments of source code to be identical in order for the violation snippets to match. The system may also concatenate the source code from multiple segments of the violation snippets into single strings and compare the strings to determine whether the violation snippets match.

In some implementations, the system does not require the violations snippets to be identical in order for violation snippets to match. The system can use fuzzy matching and approximate string matching techniques to find violation snippets that are similar but not identical. For example, the system can consider two violation snippets to be a fuzzy match if they are identical apart from whitespace and comments. The system can also consider violation snippets to be a fuzzy match if the violation snippets are calls to identical functions without considering argument names of the function calls. The system can also consider violation snippets to be a fuzzy match if the violations are both declarations of variables. The system can also consider the violations to be a fuzzy match if the violations both correspond to a same non-terminal or a same terminal in a formal representation of a source code programming language, e.g., a Backus-Naur representation.

The system can also use semantic-based matching techniques, for example, by comparing a location of the violations in an abstract syntax tree. In other words, if the violations have similar locations in the abstract syntax tree or if they correspond to identical subtrees in respective abstract syntax trees, or both, the system can consider the violation snippets to be a fuzzy match.

In terms of the example in FIG. 6, the violation snippet "apples.contains(orange)" is identical for both the line range 601 and the line range 632. Thus, the system can designate the violations as a snippet-based match, even though the violations occur in different locations in their respective files and even though the line range 601 is not identical to the line range 632.

As shown in FIG. 7, if the violation snippets match, the system adds the violation from the file B to set of violations having matching snippets so that the system can choose among potentially multiple violations having matching snippets (branch to 750). The system then determines whether there are more violations in the file B (755).

If the violation snippets did not match, the system determines whether there are more violations in the file B for comparison (branch to 755). If so, the system selects a next violation from the file B (branch to 730).

If the system has analyzed all violations in the file B, the system determines whether any violations having matching snippets were found (branch to 760). If not, the system does not determine any snippet-based matches for the selected violation and determines whether there are more violations from the file A (branch to 790).

If there were violations having matching snippets found, the system identifies a closest violation having an identical snippet (branch to 770). In other words, the system determines which violation, among the set of violations having identical snippets, has a location closest to the location of the selected violation from the file A. The system may skip this determination if only a single violation having a matching snippet was found.

The system then designates the closest violation having a matching snippet as a snippet-based match (780). The system can then repeat the process for all pairs of corresponding files between the snapshot S and the snapshot T.

As shown in FIG. 4A, the system adds the snippet-based matches to a set of matching violations (450) and removes them from the collection of violations. Once all unmatched violations have been analyzed using location-based matching tests, snippet-based matching tests, or both, the system determines hash-based matches (460).

Figure 8:
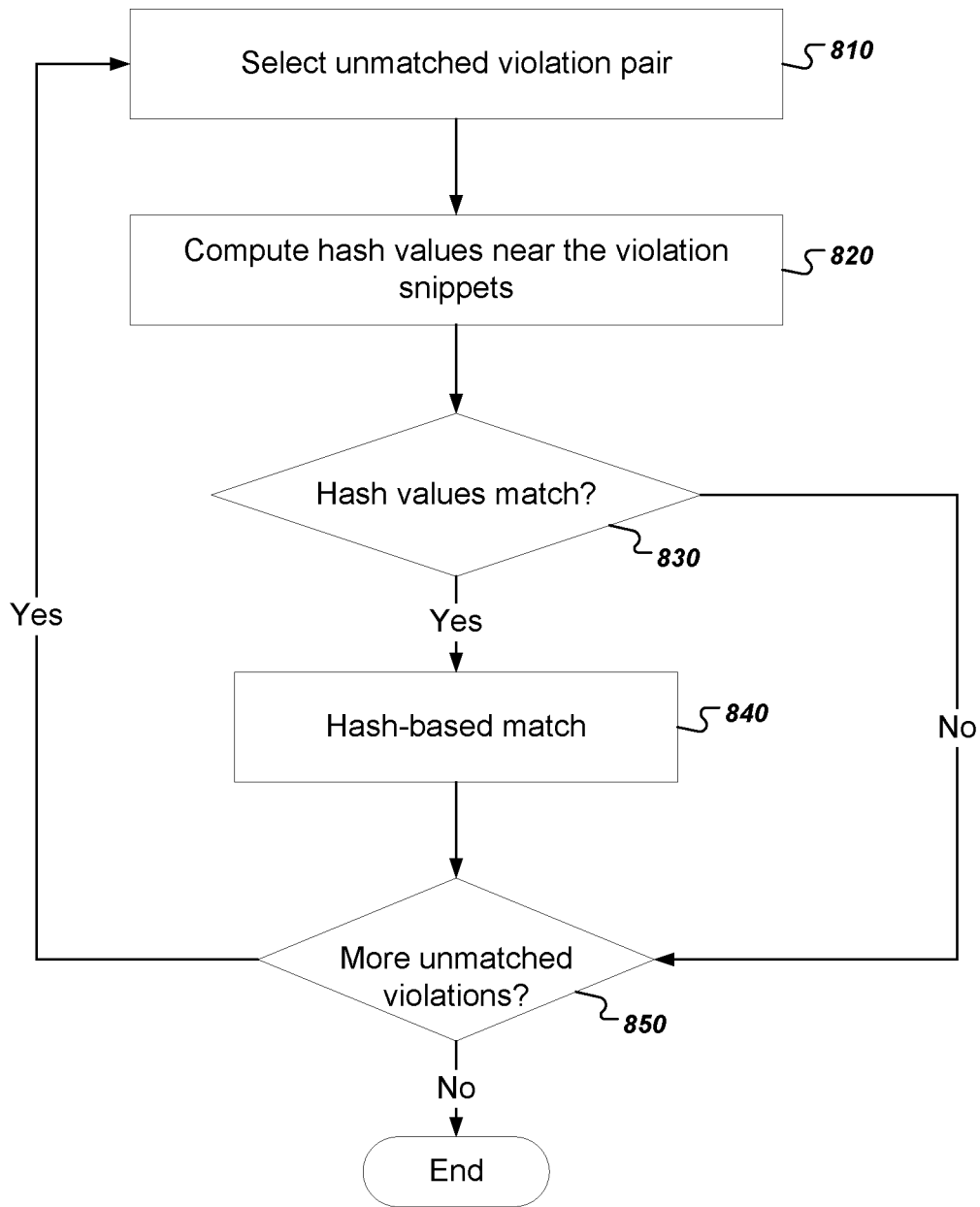
FIG. 8 is a flowchart of an example process for determining hash based matches.

FIG. 8 is a flowchart of an example process for determining hash-based matches. Hash-based matching tests compute hash values from tokens in the source code file. A token in this context is a programming-language-dependent sequence of non-whitespace or non-comment characters of the source code file, e.g., variable names, keywords, string literals, and separators. In some implementations, only the types of some of the tokens are considered rather than their actual text. For example, a hash-matching process can match code even when variables have been renamed by hashing the string "variable name" wherever a variable name occurs rather than hashing a specific variable name. A hash value computed for a sequence of N tokens in a first file will match a hash value computed for a sequence of the same N tokens in a second file. Thus, violations need not occur in corresponding files or in files having a same path in order to be hash-based matches. In particular, hash-based matches can match violations that were moved from one file to another between the snapshot S and the snapshot T The process will be described as being performed by an appropriately programmed system of one or more computers, e.g., the violation matching engine 120 of FIG. 1.

The system selects an unmatched violation pair (810). In general, because violations can be hash-based matches even if occurring in files having different paths or in files that do not correspond to one another, the system can compare each unmatched violation in the snapshot S to each unmatched violation in the snapshot T, or vice versa.

The system computes hash values for token sequences near the violation (820). For each violation of the selected pair, the system can compute multiple hash values using different token window sizes and positions.

For example, the system can compute a beginning hash value. The beginning hash value is a hash value computed using a token window that is generally positioned at the start of the violation snippet. For example, the token window can begin a particular number of tokens before the violation snippet and end with a first token of the violation snippet. Thus, the token window will generally include at least the beginning of the violation snippet. However, the system may also start the token window for the beginning hash value a number of tokens before or after the beginning of the violation snippet.

Similarly, the system can compute an ending hash value using a token window that is generally positioned at the end of the violation snippet. For example, the token window can begin with the last token of the violation snippet and end a particular number of tokens after the violation snippet. Thus, the token window will generally include at least the ending of the violation snippet. As with the beginning hash value, the system can start the token window for the ending hash value a number of tokens before or after the end of the violation snippet.

Likewise, the system can compute hash values using different token window sizes and positions relative to the respective violation. The system can also use token windows having different sizes depending on a type of the violation being matched. In some implementations, the system uses token windows having a fixed threshold size, e.g., 10 tokens, 75 tokens, or 200 tokens. The hash values can be computed using any convenient hashing algorithm.

In some implementations, the hash value is computed using a rolling hash function, e.g., the Rabin-Karp rolling hash, in which the hash value is computed using a fixed window of tokens in the sequence. For violations that occur near the beginning or the end of a source code file, the beginning hash value or the ending hash value may be undefined. The system can thus disregard undefined hash values. The system may also crop the token window accordingly to accommodate the beginning or the endings of a source code file. The system can also adjust the token windows at the beginning or end of the files to use the first or last token windows available for a particular token window size.

The system determines whether any of the hash values match (830). If any of the computed hash values matching between the snapshot S and the snapshot T, the system determines that the violations are a hash-based match (branch to 840).

Otherwise, the system determines whether there are more unmatched violations to be tested (branch to 850).

If there are more pairs of unmatched violations to be tested, the system selects a next pair of unmatched violations (branch to 810).

As shown in FIG. 4A, the system adds the hash-based matches to a set of matching violations (470) and removes them from the collection of violations.

After determining all pairs of matching violations, the system can determine unmatched violations and attribute the unmatched violations. As described above with reference to FIG. 2A, the system typically attributes status changes of violations to the snapshot T or to the developer responsible for the snapshot T.

Figure 4B:
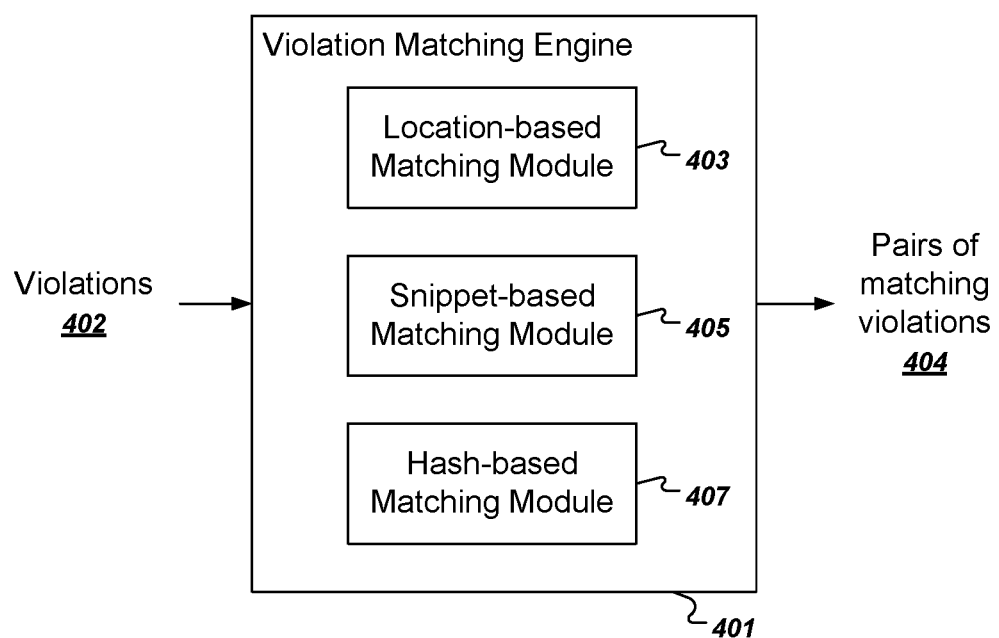
FIG. 4B is a block diagram of an example violation matching engine.

FIG. 4B is a block diagram of an example implementation 401 of a violation matching engine 120. This violation matching engine implementation 401 includes a location-based matching module 403, a snippet-based matching module 405, and a hash-based matching module 407. The violation matching engine implementation 401 receives violations 402 and generates pairs of matching violations 404. The modules each implement any one the location-based matching, snippet-based matching, or hash-based matching processes, respectively, described in this specification.

Figure 9:
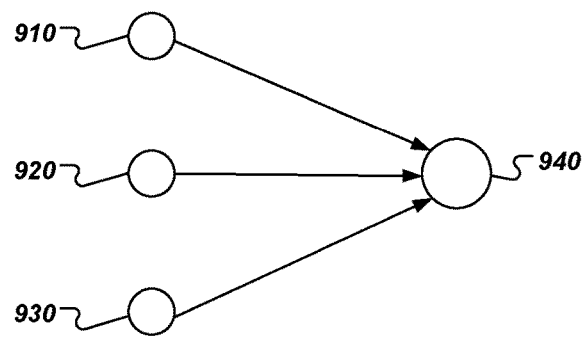
FIG. 9 is a diagram of a revision graph that shows a merge commit.

FIG. 9 is a diagram of a revision graph that shows a merge commit. A system can attribute violations in merge commit in a different way than for other, single-parent commits. A merge commit occurs when changes from multiple parent snapshots are merged into a child snapshot. In FIG. 9, the snapshot 940 has three parent snapshots, a first parent snapshot 910, a second parent snapshot 920, and a third parent snapshot 930.

Figure 10:
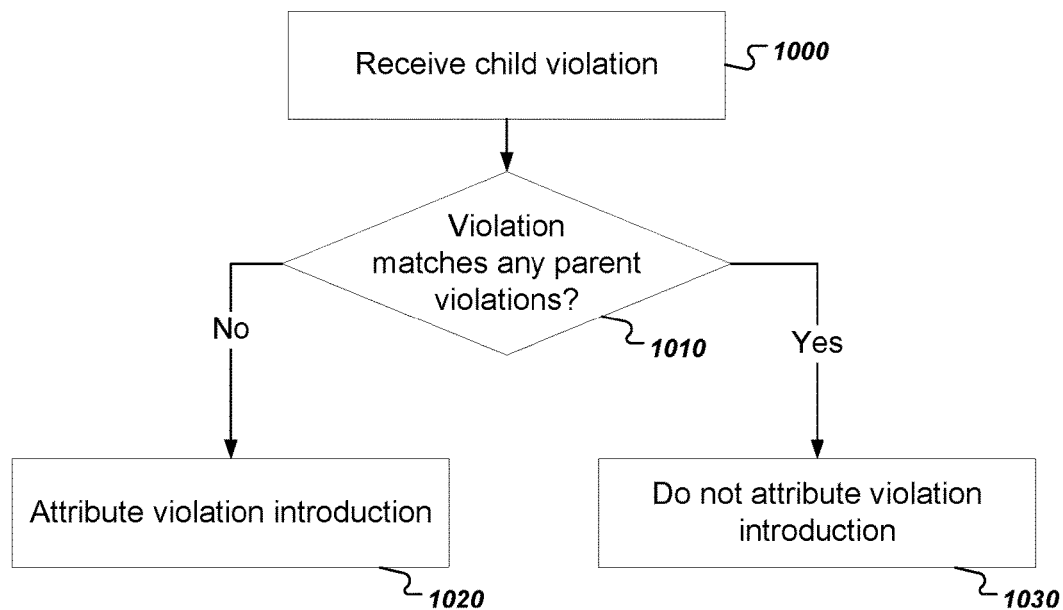
FIG. 10 is a flowchart of an example process for attributing introduced violations in a merge commit.

FIG. 10 is a flowchart of an example process for attributing introduced violations in a merge commit. The process will be described as being performed by an appropriately programmed system of one or more computers, e.g., the attribution engine 130 of FIG. 1.

The system receives a child violation (1000). A child violation represents a violation that is present in the child snapshot.

The system determines whether the violation matches any parent violation or violations of the multiple parent snapshots (1010). If the child violation does match a parent violation, the system does not attribute the violation introduction to the child snapshot or to a particular developer (branch to 1030).

On the other hand, if the child violation does not match any parent violations, the system can attribute the child violation introduction to the child snapshot or to a developer responsible for the child snapshot (branch to 1020).

Figure 11:
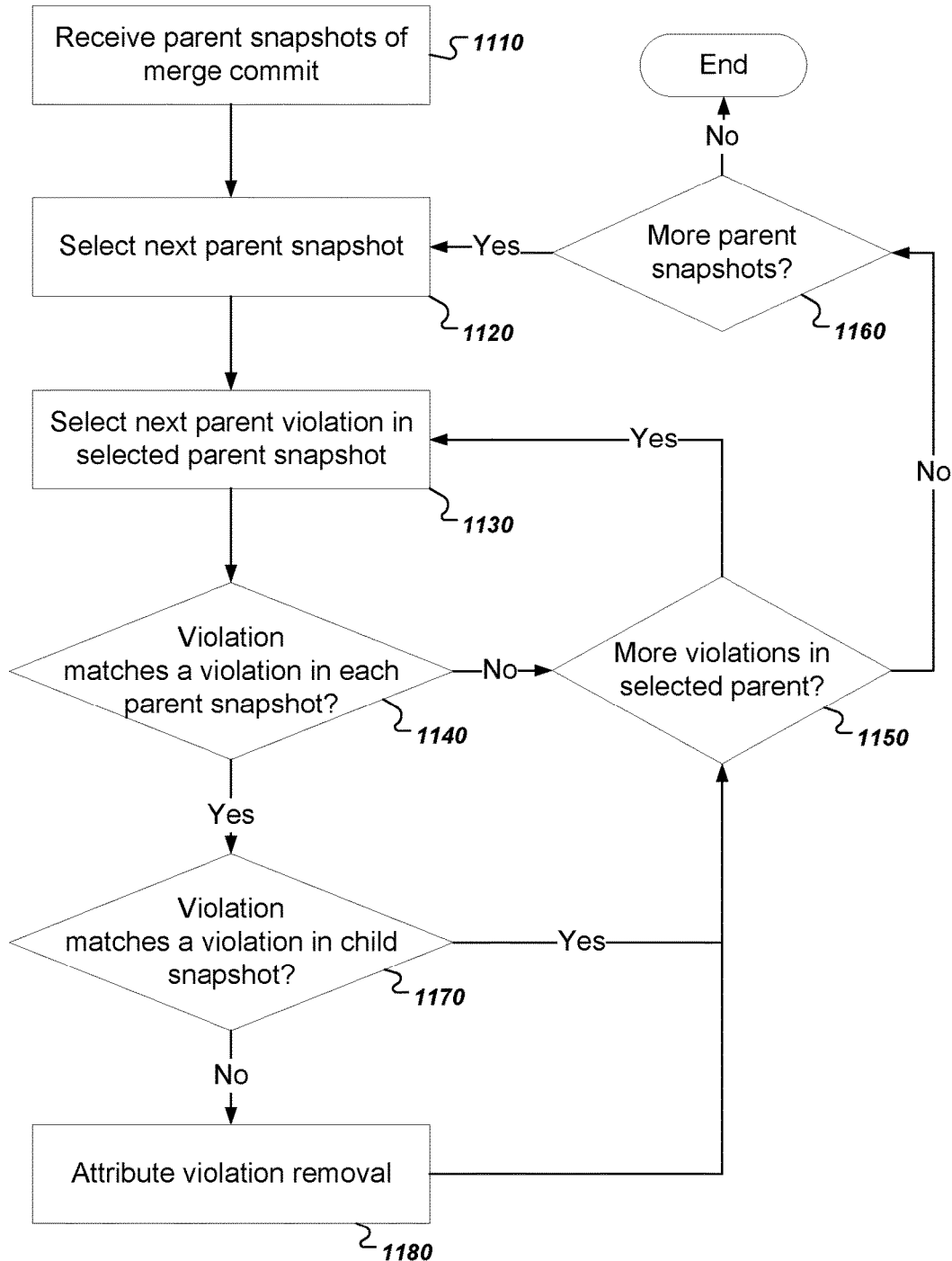
FIG. 11 is a flowchart of an example process for attributing removed violations in a merge commit.

FIG. 11 is a flow chart of an example process for attributing removed violations in a merge commit. The process will be described as being performed by an appropriately programmed system of one or more computers, e.g., the attribution engine 130 of FIG. 1.

The system receives parent snapshots of a merge commit (1110). In general, the system will iterate over each parent snapshot as a starting point to attempt to identify a violation that matches a violation in all parent snapshots. In general, violation matching may not be a transitive relationship. For example, a system may start with a first violation v1 in a first parent snapshot. The first violation v1 may match a second violation v2 in a second parent snapshot, but may not match any violations in a third parent snapshot. The system can thus start the process again with v2, as it is possible that v2 will match violations in both the first and third parent snapshots, even though v1 did not.

The system selects a next parent snapshot (1120). In general, the system will search each parent snapshot for violations that have a match in each other parent snapshot.

The system selects a next violation in the selected parent snapshot (1130). Within the selected parent snapshot, the system will iterate over violations to try to find violation match each other parent snapshot.

The system determines whether the selected parent violation has a matching violation in each other parent snapshot (1140). If the parent violation does not have a matching violation in each of the other parent snapshots, the system determines whether there are more violations within the selected parent snapshot (branch to 1150).

If so, the system selects a next parent violation in the selected parent snapshot (branch to 1130).

If not, the system determines whether there are more parent snapshots (branch to 1160). If there are more parent snapshots, the system selects a next parent snapshot (branch to 1120). If not, the process ends.

If the selected parent violation does have a matching violation in each of the other parent snapshots, the system determines whether the parent violation also matches a violation in the child snapshot (branch to 1170). If the parent violation also matches a violation in the child snapshot, the system does not attribute a status change for the violation and determines whether there are more violations in the selected parent snapshot (branch to 1150).

If the parent violation does not match a violation in the child snapshot, the system attributes a violation removal to the child snapshot or to the developer responsible for the child snapshot (branch to 1180). The system can then determine whether there are more violations in the selected parent snapshot (1150).

Figure 12:
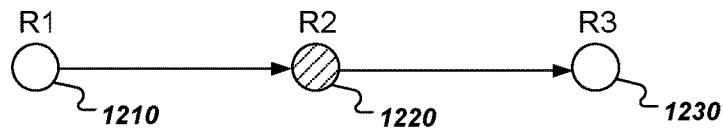
FIG. 12 is a diagram of a revision graph having an unanalyzable snapshot.

FIG. 12 is a diagram of a revision graph having an unanalyzable snapshot. Some snapshots may not be analyzable by a static analysis system. For example, the snapshot may rely on missing libraries or other dependencies. Thus, the system may attribute violations in snapshots having one or more unanalyzable parents in a different way than violations in other snapshots.

The revision graph in FIG. 12 has three snapshots, a first snapshot R1 1210, a second later snapshot R2 1220, and a third even later snapshot R3 1230. The snapshot R2 is an unanalyzable snapshot. Thus, the system may only be able to compute matching violations between R1 1210 and R3 1230.

Figure 13:
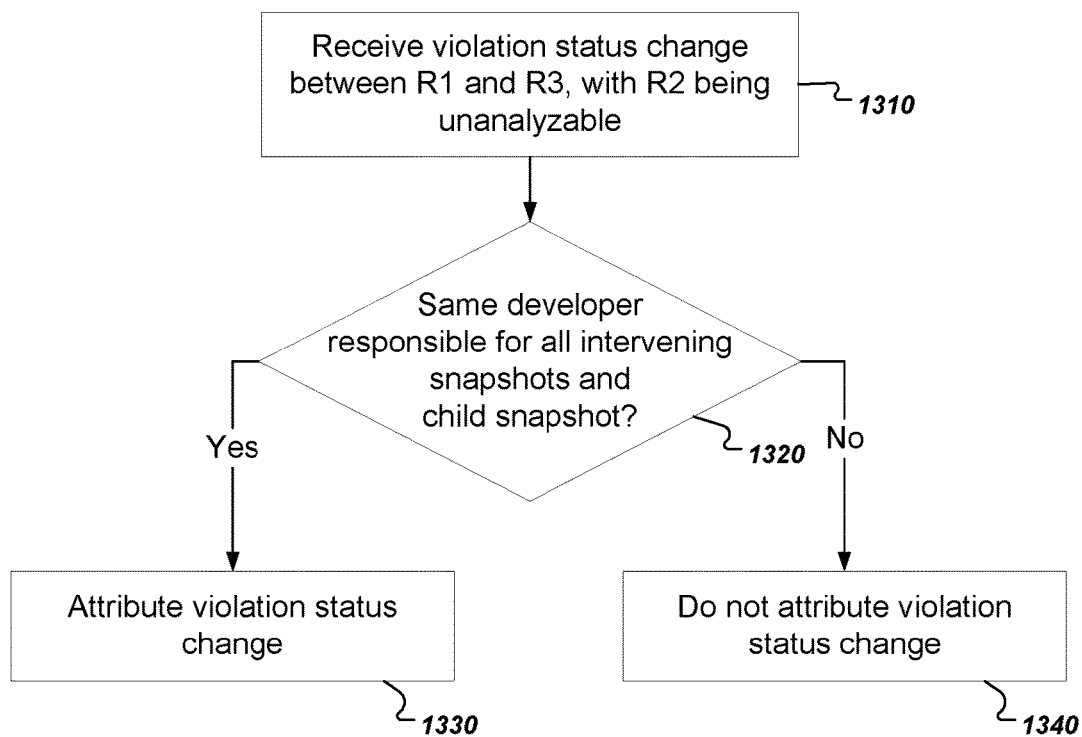
FIG. 13 is a flowchart of an example process for attributing violation status changes for a revision graph having an unanalyzable snapshot.

FIG. 13 is a flow chart of an example process for attributing violation status changes for a revision graph having an unanalyzable snapshot. The process will be described as being performed by an appropriately programmed system of one or more computers, e.g., the attribution engine 130 of FIG. 1.

The system receives a violation status change between a first snapshot R1 and a third snapshot R3 with an intervening unanalyzable snapshot R2 (1310). The system may also receive any number of unanalyzable snapshots between R1 and R3 in the revision graph.

The system determines whether a same developer or group of developers was responsible for all intervening snapshots and the child snapshot (1320). If the same developer was responsible, in that sense, for all intervening snapshots and the child snapshot, the system does attribute the violation status change to the developer (branch to 1330). If not, the system does not attribute the violation status change (branch to 1340).

The system can be implemented to generalize this approach further. In a revision graph having a sequence of snapshots by the same developer, the system can attribute violation status changes to the developer as long as the last snapshot in the sequence is analyzable. The system can attribute violation status changes to this developer, even if one or more snapshots in the sequence are unanalyzable.

An example system may use canonical representations to represent violation matching information. This way of representing violation matching information may be beneficial because it reduces the storage space required to store violation matching information.

Using canonical representations to store violation matching information can be particularly beneficial for storing information about violations that transitively match each other. Transitively matched violations are matching violations that represent coding defects that persist in the code base through a sequence of snapshots of the code base. Determining transitively matched violations provides insight into the lifecycle of a coding defect. For a given transitively matched violation, the transitively matched violation can provide information to determine a developer who introduced the coding defect and when, and a developer who fixed the coding defect and when, if the defect has been fixed. Additionally, transitively matched violations provide information that can be used to determine which developers introduced the most outstanding violations in the code base, the responsiveness of developers, violations that weren't fixed by a developer or fixed quickly enough, the average lifespan of a violation, and the types of violations that tend to get fixed quickly or slowly.

Transitively matched violations provide information to determine which developers tend to fix other developers' violations, which can be used to target training and developer pairing. The history of violations as indicated by transitively matched violations can indicate which types of violations get fixed faster than others, which can be used to assign priorities to different types of violations. Transitively matched violations also provide more robust violation attribution in the presence of unanalyzable snapshots.

Figure 14:
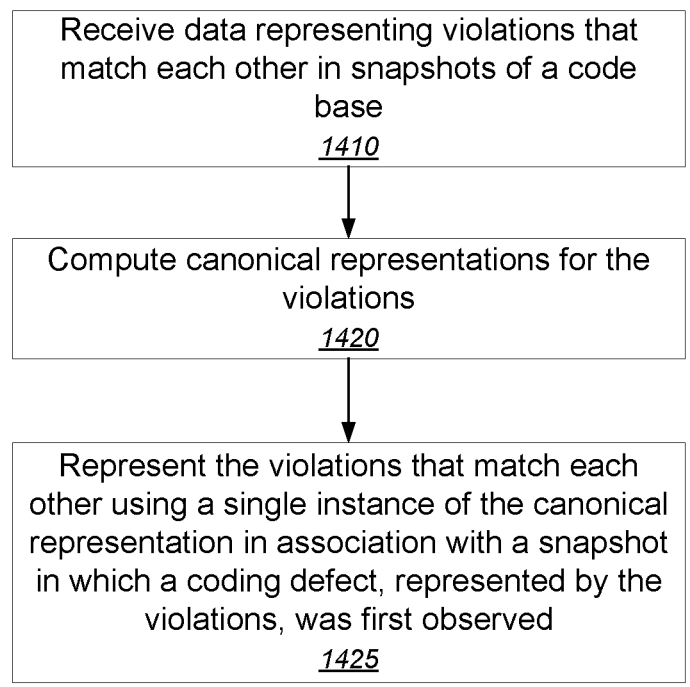
FIG. 14 is a flowchart of an example process for aggregating violations.

In general, an example system may receive data representing violations that match each other in respective snapshots of a code base, as illustrated by the flowchart in FIG. 14 (1410). An example system may compute the violations' canonical representations (1420) and represent the violations that match each other using a single instance of a canonical representation associated with the violation representing a coding defect in the snapshot in which the coding defect was first observed (1425). Subsequent canonical representations associated with matching violations, but different from the initial canonical representation, may be mapped in the order in which they appear in the snapshots.

The canonical representation of the violation representing when the coding defect was eliminated may also be designated. The example system allows for static analysis including determining aggregated statistics without storing information identifying pairs of violations that match each other. Using the stored canonical representations, an example applications engine 180 can quickly compute individual statistics for each violation, e.g., how long the violation existed in the code base 140 and aggregated statistics, e.g., an average length of time that a violation of a certain type existed in the code base 140. Additionally, the application engine 180 can compute developer-specific or team-specific statistics, e.g., which developers or teams introduced which violations currently outstanding in a code base, or how much time passed before developers or teams fixed coding defects.

In some static analysis systems, a tiny change to a source code file for a snapshot can produce dramatic differences in static analysis results. For example, adding a blank line to the top of a source code file can change every line number for the violations identified by a corresponding static analysis results file, even though the blank line has no effect on the existence of the violations themselves.

An example static analysis system may therefore generate a canonical representation using a stable location identifier of each violation that identifies a coding defect. By generating a canonical representation of a violation using a stable location identifier, even if there are slight changes to the violation, e.g., a change in violation location, violations can be recognized as representing the same coding defect. The canonical representation of a violation using a stable location identifier may be computed for a given violation in isolation of any other revision or additional information. All that may be necessary to compute a canonical representation for a violation is the violation itself and the source code file in which the violation exists. The canonical representation as a stable location identifier of a violation can then be used to compare a violation with other violations across the snapshot and across revisions.

An example static analysis system may generate a canonical representation of a violation as a stable location identifier for a violation that does not change in any significant way when inconsequential changes are introduced to the source code files. To generate a stable location identifier, the system may use a location signature, e.g., as a unique contextual identifier, instead of line numbers, character offsets, or other absolute location identifiers. By using stable location identifiers, static analysis results may be more stable when there are inconsequential changes to source code files.

A stable location identifier may be created by generating a hash for each relevant location, e.g., segment, of the particular source code file using a particular quantity of characters before, after, or surrounding a location of a coding defect represented by a violation. The code analysis system can guarantee generation of a unique signature for each location by also using a count that represents the number of earlier locations in the particular source code file with the same hash. For example, the first location in a particular source code file having a hash of "7a8b11" can be assigned a signature of "7a8b11:0," the second location in the particular source code file having the hash of "7a8b11" can be assigned a signature of "7a8b11:1," and so forth. Suitable techniques for generating stable location identifiers are described in commonly-owned U.S. patent application Ser. No. 15/201,919, "Stable File Location Identifiers," filed on Jul. 5, 2016, which is herein incorporated by reference.

In some implementations, the code analysis system stores in a results file the location signatures for the relevant locations from the particular source code file in which violations occur rather than line numbers, character offset, or any other absolute location in the file. When a storage system includes multiple snapshots of source code and corresponding results file, the use of location signatures can reduce the likelihood that results files change among snapshots without substantial edits to the corresponding source code files that change the resulting violations. Using location signatures can reduce the amount of storage required to store the results files, e.g., when each snapshot that has the same results file can point to the exact same data in the data store.

The canonical representation of a violation may be used to determine whether the violation matches another violation. As discussed above, two violations match each other if they refer to the same defect in their respective code bases.

A static analysis system can also identify transitively matched violations in the code base. A transitively matched violation is a same coding defect occurring in each of a sequence of snapshots of the code base, where the sequence is defined by edges between nodes of the code base revision graph. For example, a coding defect that was introduced by a developer in snapshot S and was not removed until a few snapshots later in snapshot X is a transitively matched violation. Thus, a transitively matched violation can represent the lifecycle of a coding defect in the code base.

A system can identify a transitively matched violation by identifying a sequence of matching violations $v_1, v_2, \ldots, v_n$, with $v_1$ matching $v_2$, $v_2$ matching $v_3$, and so on through $v_{n-1}$ matching $v_n$, with each successive violation occurring in a successive snapshot of a sequence of snapshots in a code base revision graph.

A system can represent a transitively matched violation in a number of ways. In particular, the representation of intermediate violations in the sequence of matching violations can be explicit or implicit. For example, a system may explicitly represent a transitively matched violation using all matching violations in the sequence of matching violations.

However, the intermediate violations need not be represented explicitly. For example, a system may represent a transitively matched violation by a tuple $(v_1, v_2, S)$, with $v_1$ and $v_2$ identifying respective violations that represent the first and last occurrences of the coding defect respectively, and with S representing the first snapshot subsequent to the snapshot of $v_2$ in the revision graph not having a coding defect that $v_2$ matches. In other words, S represents the first snapshot after the snapshot of $v_2$ in which the coding defect became absent. If the coding defect never became absent in the code base, the system can use a special reserved value, e.g., "null," to indicate that the coding defect never became absent. For example, if $v_2$ occurred in a snapshot having no children, which may be the most recently committed snapshot of the code base, the coding defect represented by $v_2$ would never have become absent.

Any pair of matching violations can be treated as a single, transitively matched violation represented by each of the matching violations. Furthermore, a single violation can also be represented the same way as a transitively matched violation when $v_1$ and $v_2$ refer to the same violation.

A transitively matched violation can be represented and stored as a data element that includes information about two or more violations representing respective occurrences of a same coding defect in the coding base over a sequence of multiple snapshots. However, these data elements require a great deal of storage space in order to store matching violations. Additionally, using these data elements to perform calculations and provide static analysis on a code base is computationally intensive.

A static analysis system can represent violation matching information across snapshots that reduces storage and computational time in a static analysis system.

Figure 15:
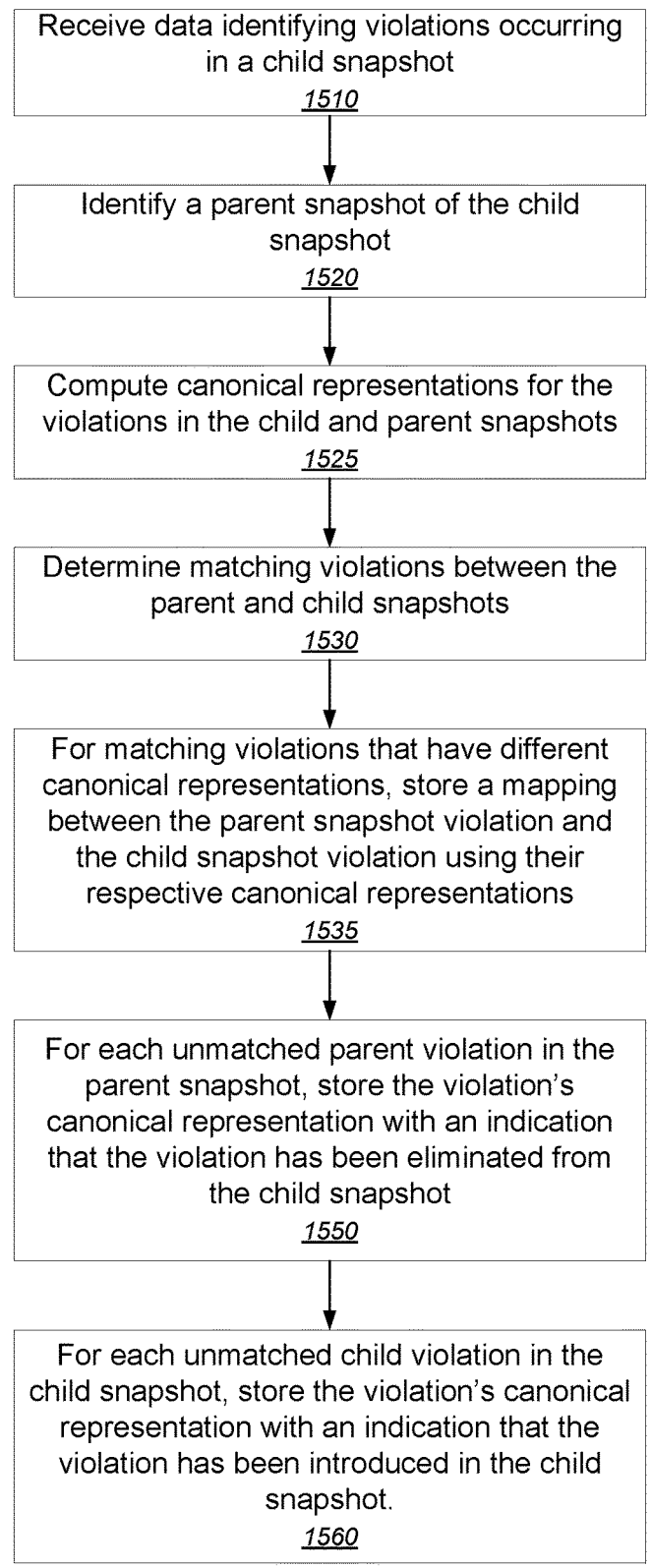
FIG. 15 is a flowchart of an example process for reducing storage necessary to represent violations across code base revisions.

FIG. 15 is a flowchart of an example process for storing violation matching information. The example process describes actions taken when computing matching violation information for a single child snapshot relative to the child snapshot's parent snapshot in a revision graph. However, the example process will typically also be applied to hundreds or thousands of other snapshots as they are processed by a static analysis system. The process can be implemented by one or more computer programs installed on one or more computers. The process will be described as being performed by an appropriately programmed system of one or more computers, e.g., the static analysis system 102 of FIG. 1.

The system receives data identifying violations occurring in a child snapshot (1510). The system, identifies the received snapshot's parent snapshot in a revision graph (1520).

The system computes a canonical representation for each violation in the parent and child snapshots (1525) as discussed above.

The system determines matching violations between the parent and child snapshots (1530). For example, the system can use the matching processes described above with respect to FIGS. 2A-13.

In some implementations, the system augments or replaces the location-based matching process described with reference to FIG. 5 with a new matching process that simply compares their canonical representations. In other words, if two violations have canonical representations that match each other, the violations are considered to be matching violations. If the two violations do not have canonical representations that match each other, the system can continue to perform one or more of the other matching processes, e.g., the location-based, snippet-based, or hash-based matching processes described above.

For matching violations that have different canonical representations, the system stores a mapping between the parent snapshot violation and the child snapshot violation may be stored using their respective canonical representations (1535). A mapping between the canonical representations of two violations represents that the violations are matching but that they have different canonical representations. This usually indicates that the violations were not identified as matching by the location-based matching process, but rather by the snippet-based or hash-based matching processes.

For each unmatched parent violation in a parent snapshot, the system stores each violation's canonical representation along with an indication that the violation has been introduced in the child snapshot (1550).

For each unmatched child violation in the child snapshot, the system stores each violation's canonical representation along with an indication that the violation has been removed in the child snapshot (1560).

The system may determine matched violations with different canonical representations and unmatched violations, i.e., identify violations that are mapping changes of canonical representation and violations that are not matching violations. Matched violations with different canonical representations may correspond to a change in the violation, meaning that the violation may have a new canonical representation. In these instances, the mapping from the violation's old canonical representation in snapshot S to the violation's new canonical representation in snapshot T may be stored by the system.

Figure 16:
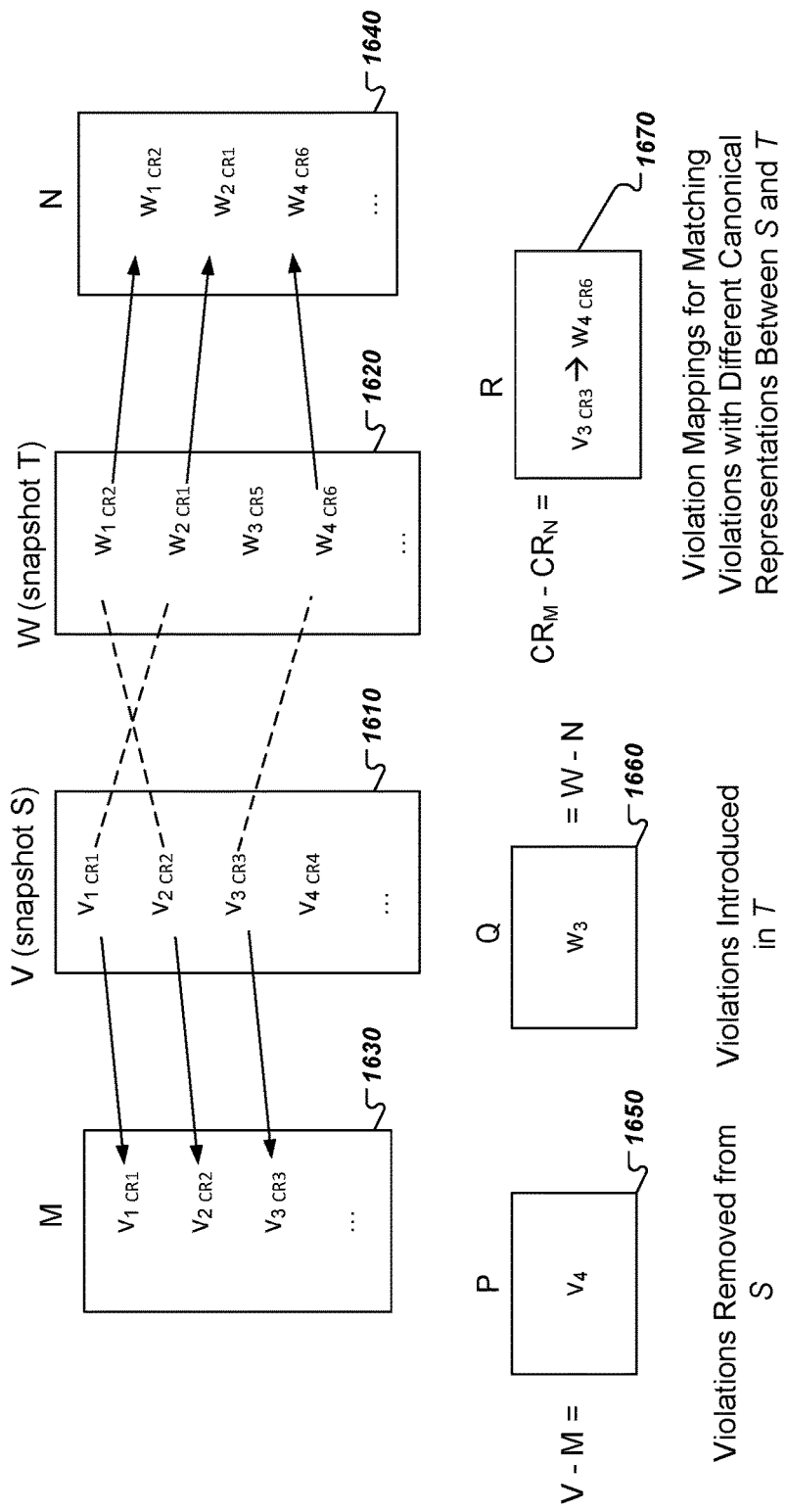
FIG. 16 illustrates determining matching violations with different canonical representations and unmatched violations.

FIG. 16 illustrates determining matching violations with different canonical representations and unmatched violations. In some implementations, the system maintains a set V 1610 of violations in the snapshot S and a set W 1620 of violations in the snapshot. The system then determines matching violations. In FIG. 16, matching violations between V and W are indicated by the dashed lines.

When a violation in S matches a violation in T, the system may add the violation in S to a set M 1630 of matched violations in S. Similarly, when a violation in T matches a violation in S, the system may add the violation T to a set N of matched violations in T. An example system may add the matched violations in match order to the respective sets so that a first violation of set M is a match for the first violation of set N. For example given set M={$V_1$, $V_2$, $V_3$} and N={$W_1$, $W_2$, $W_4$}, violations in corresponding positions within the sets may be matching. In this example, $V_1$ matches with $W_1$, $V_2$ matches with $W_2$, and $V_3$ matches with $W_4$. Alternatively, pairs of matching violations may be added to a single set where the first violation of each pair may be from snapshot S and the second violation of each pair may be from snapshot T. In this example, the set of matching pairs may be represented as: {($V_1$,$W_1$), ($V_2$, $W_2$), ($V_3$, $W_4$)}

An example system may determine a set P 1650 of unmatched violations in S by computing a set difference P=V−M between the set V 1610 and the set M 1630. An unmatched violation in the parent snapshot S represents a removal of the violation from the child snapshot T. Therefore, an example system may store this violation status change for each eliminated violation using the canonical representation of the violation, information regarding the child snapshot or file revision that eliminated the violation, and an indication that the violation has been eliminated.

Likewise, the system may determine a set Q 1660 of unmatched violations in T by computing a set difference Q=W−N between the set W 1620 and the set N 1640. An unmatched violation in the child snapshot T represents an introduction of the violation into the code base from the child snapshot T Therefore, an example system may store this violation status change for each introduced violation using the canonical representation of the violations, information regarding the child snapshot or file revision that introduced the violation, and an indication that the violation has been introduced.

Additionally, an example system may determine a set R 1670 of violation mappings by computing a set difference R=$CR_M$−$CR_N$ between the canonical representations of the violations in set M and the canonical representations of the violations in set N 1640. This set difference works when the matched violations appear in sets M 1630 and N 1640 in corresponding positions where the violation in the first position of set M 530 matches with the violation in the first position of set N 1640 and so forth. If pairs of matching violations occur in the set, an example system may determine the pairs with different canonical representations. A matched pair of violations that have different canonical representations can represent a coding defect that was moved from one file to another between snapshots. Other violations having similar hashes may also cause the canonical representation to change due to the similar hashes forcing the stable location ids to be renumbered. Therefore, an example system may store this mapping for each violation pair that has a different canonical representation. An example system may store a mapping between the violation's canonical representation in snapshot S and the violation's canonical representation in snapshot T in the form, for example: {canonical representation in S, canonical representation in T}. For example, as shown in FIG. 16, $V_3$ matches with $W_4$, but these violations have different canonical representations. Therefore, the canonical representation of $V_3$ is mapped to the canonical representation of $W_4$, CR3→CR6 or {CR3, CR6}.

The canonical representation of a violation may change multiple times during the course of code base revisions. In some implementations, each change of the canonical representation will result in a mapped pair as discussed above. In other implementations, violation mapping links may chain together to form a violation mapping link of all the canonical representation changes for a transitively matched violation. For example, there may be a snapshot U that is the child snapshot of snapshot T In snapshot U, there may be a violation $X_5$ with a canonical representation CR8 that matches with violation $W_4$ of its parent snapshot, T. Although there is a match on violations, the canonical representation of $W_4$ (CR6) does not match the canonical representation of $X_5$ (CR8). Thus the example system may create a mapping between CR6 and CR8, CR6→CR8, {CR3, CR8}. However, since there is already a mapping between CR3 and CR6, some implementations may create a chain of linked mappings to represent the violation canonical representation change. Therefore, an example system may append the new mapping to the already-stored mapping to generate a link for the entire mapping, CR3→CR6→CR8, {CR3, CR6, CR8}.

An example system may store violation introductions, eliminations, and/or mappings in different data storage structures. FIGS. 17A-C represent examples of individual data storage structure tables for storing introduction (FIG. 17A), elimination (FIG. 17B), and mapping data (FIG. 17C) respectively. FIGS. 17A and 17B show storing the canonical representation of a violation along with the snapshot in which the violation is found. For example, in FIG. 17A, data entry 1710 shows that a violation with the canonical representation, 7a8b11:0, was introduced in snapshot S1. In FIG. 17B, data entry 1705 shows that the violation with the canonical representation, 7a8b11:0, was eliminated in snapshot S3. FIG. 17C shows storing violation mapping data by mapping an old canonical representation with a new canonical representation. For example, data entry 1712 shows a violation with a canonical representation 4d2a41 being mapped to a matching violation with a new canonical representation of 3a8d71. FIG. 18 shows an example of a combined data storage structure table for storing elimination, introduction, and mapping data in the same data storage structure. In this data storage structure, fields may be populated depending on the type of data entry is stored. For example, data entry 1800 shows a violation introduction. The canonical representation of the violation, 7a8b11:0, is stored along with the snapshot in which the violation was introduced, S1, and an indication that the violation was introduced using an indication type "I." For a mapping entry, a canonical representation of a violation may be stored with a In general, a system receives data representing violations in a snapshot T. The system can then either receive violations in a parent snapshot or identify a parent snapshot of T and compute T's violations. The system may then perform a number of pair-wise matching tests between the violations.

In the matching process, in general, the system may match as described above. Alternatively, the system may first match violations by canonical representation. In some implementations, if there is a match on canonical representation, the example system does not try to match further. In other implementations, even if there is a match, the system will try to match on other criteria. When there is no match on canonical representation or when the system matches on other criteria as well, the system may perform other matching tests in succession.

After determining all pairs of matching violations, the system may determine unmatched violations and changes to a violation or the violation's canonical representation. The system may determine whether a violation matches any parent violation or violations of multiple parent snapshots. If the child violation does match a parent violation, the system may not attribute the violation introduction to the child snapshot or to a particular developer. If the child violation matches a parent violation, but has a different canonical representation, the system may determine that there is a change in canonical representation of a violation for a specific coding defect. The mapping from the parent violation's canonical representation to the child violation's canonical representation may be stored and this mapping may be attributed to a particular developer and/or the child snapshot. If the child violation does not match any parent violations, the system may attribute the child violation introduction to the child snapshot or to a developer responsible for the child snapshot. When a child snapshot is compared to its direct parent snapshot, the system may determine any unmatched parent violations to be violation eliminations and attribute the removal of a violation to the particular developer responsible for the child snapshot and/or to the child snapshot.

An example system may use stored violation matching information to determine attributions for introductions, eliminations, and mappings. The system may also analyze the violation matching data to determine individual statistics for violations such as how long the violation has existed in the code base and/or aggregated statistics such as an average length of time that a certain type of violation usually exists in the code base. In general, a system may receive a violation on which to perform analysis. The system may then compute the canonical representation of the violation. The system may obtain canonical representations of introduction, elimination, and mappings of violations that have been previously processed and stored by the system as discussed above with regard to FIG. 16. For example, the system may receive a violation with a computed canonical representation of "3a8d71." The system may use this canonical representation to determine when the coding defect represented by the violation was first-observed in the code base and/or when the coding defect was last observed in the code base, even though the coding defect may correspond to many matching violations from many different snapshots.

Figure 19:
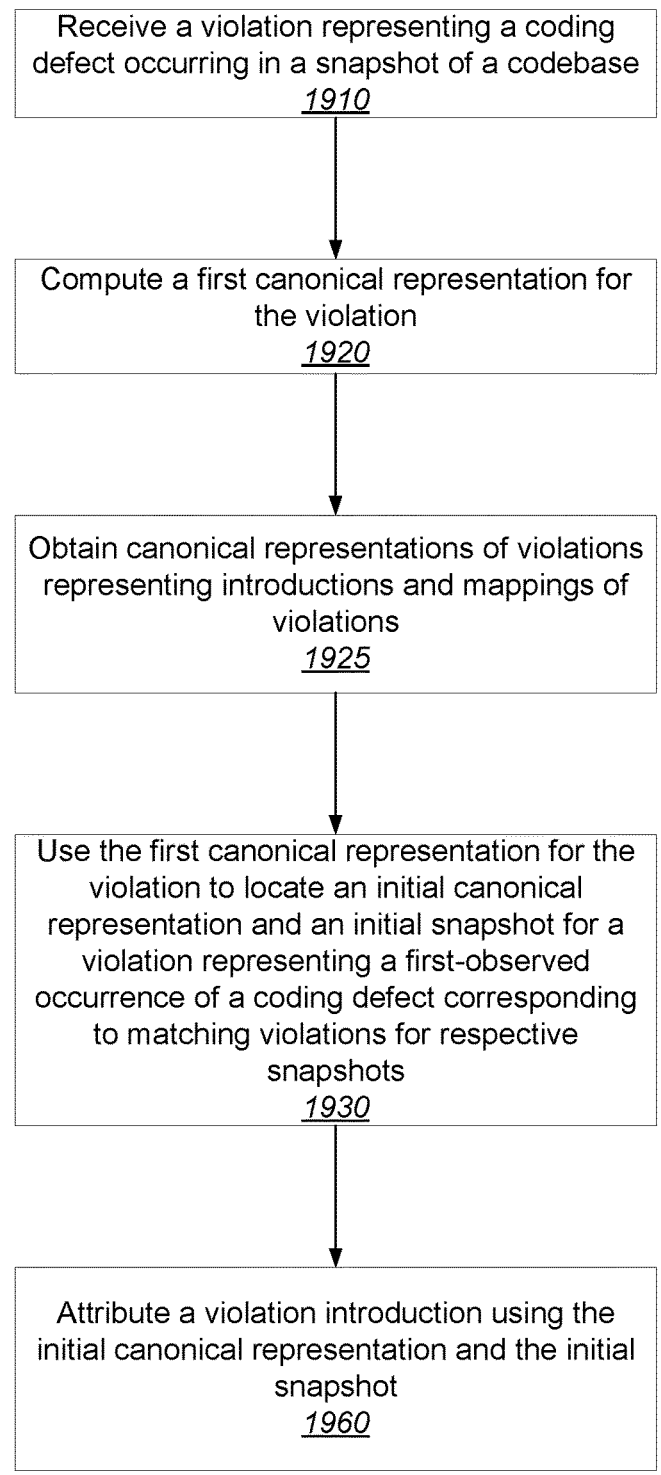
FIG. 19 is a flowchart of an example process for attributing a violation introduction.

FIG. 19 is a flowchart of an example process for determining and attributing a violation introduction. The process can be implemented by one or more computer programs installed on one or more computers. The process will be described as being performed by an appropriately programmed system of one or more computers, e.g., the static analysis system 102 of FIG. 1.

The system receives a violation representing a coding defect occurring in a snapshot of a code base (1910). The system computes a canonical representation for the violation (1920). The system obtains canonical representations of violations from the system's data structures representing introductions and mappings of violations in the static analysis system (1925). These canonical representations can be obtained by querying the data structure or data structures that hold the introduction, elimination, and mapping data. For example, given the data in either tables FIG. 17A-C or in FIG. 18, an example system may return all the rows in each data structure or may filter the returned rows by canonical representation. In some implementations the data structures may be queried together and in other implementations the data structures may be queried separately. In some implementations, the data structure or structures are queried using the canonical representation of the received violation. A query made to the system using the canonical representation may return all rows in the data structure that contain the received violation's canonical representation.

The system uses the canonical representation, in the example case "3a8d71," to locate an initial canonical representation along with the initial canonical representation's snapshot for a violation representing a first-observed occurrence of the coding defect (1930). By querying data structures as represented by FIGS. 17A-C and FIG. 18, an example system may return the violation mappings: {{4d2a41, 3a8d71}, {3a8d71, 8a8b14}} (1712, 1742, 1855, 1870). In this example data, "3a8d71" only appears in mapping data.

In order to determine when the coding defect represented by the violation with a canonical representation of "3a8d71" was first introduced, an example system may query the data structure(s) using a canonical representation mapped as a parent from a previous revision, to "3a8d71," which, as shown above, is "4d2a41." As discussed above, a mapping between two canonical representations may be defined as a mapping between matching violations representing the same coding defect. The mapping may map the old canonical representation of a violation to a new canonical representation of a violation using the form: {old violation canonical representation, new violation canonical representation}. In the case of chained mappings, new versions of canonical representations may be appended to the end of the chain so that the start of the canonical representation chain represents the first violation representing a specific coding defect and the last canonical representation in the chain represents the last mapping change of the specific coding defect. By querying the data structure(s) for "4d2a41," The system returns results indicating an introduction of "4d2a41" at snapshot S1 as shown in FIG. 17A (1750) and FIG. 18 (1820). The time of snapshot S1 may be determined to be the introduction into the code base of the coding defect represented by the violation with the canonical representation of "3a8d71." The system may also use the found snapshot to determine attribution for the violation introduction representing an introduction of a coding defect in a code base (1960).

Figure 20:
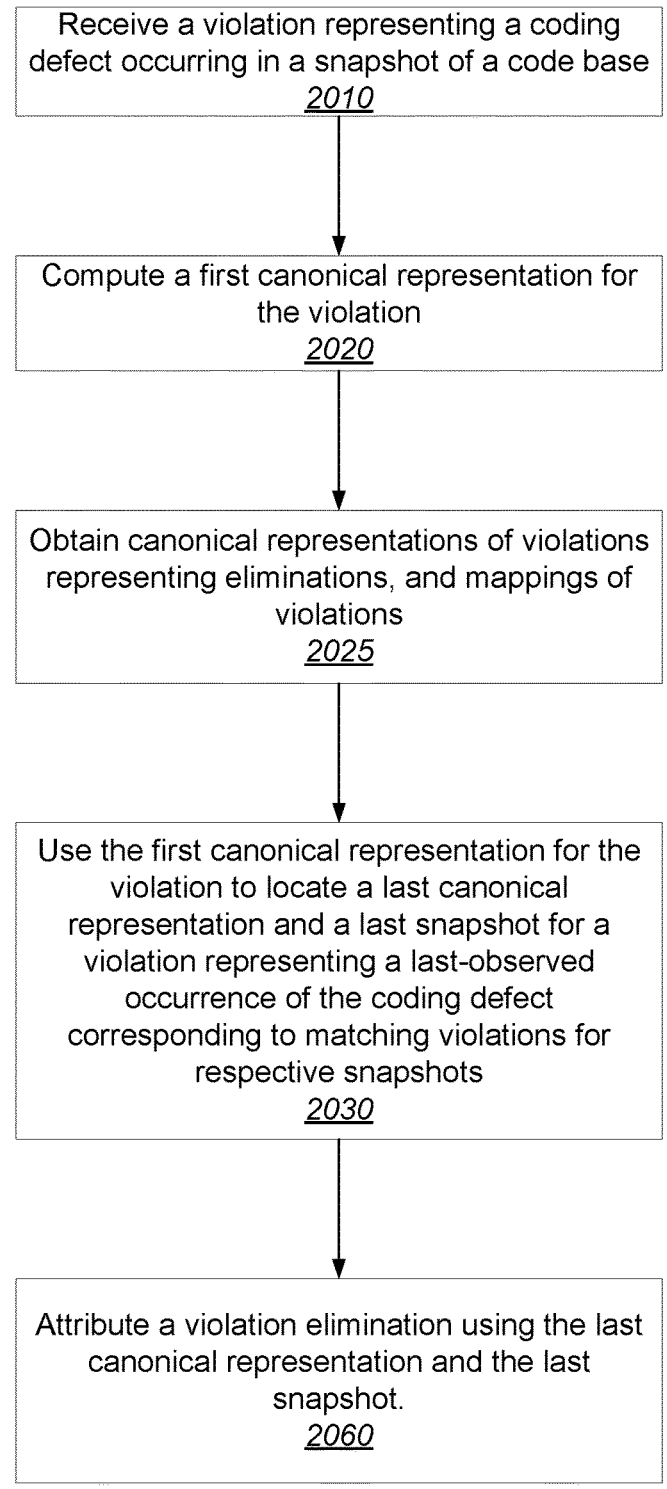
FIG. 20 is a flowchart of an example process for attributing a violation elimination.

FIG. 20 is a flowchart of an example process for determining and attributing a violation elimination. The process can be implemented by one or more computer programs installed on one or more computers. The process will be described as being performed by an appropriately programmed system of one or more computers, e.g., the static analysis system 102 of FIG. 1.

The system receives a violation representing a coding defect occurring in a snapshot of a code base (2010). The system computes a canonical representation for this violation (2020). An example system may obtain canonical representations of violations from the system's data structures representing eliminations and mappings of violations in the static analysis system (2025). The example may use the canonical representation to locate a last canonical representation and a last snapshot for a violation representing a last-observed occurrence of the coding defect corresponding to matching violations for respective snapshots (2030).

To determine when the coding defect represented by the violation with a canonical representation of "3a8d71" was last observed, an example system may query the data structure(s) for the canonical representation mapped to "3a8d71" as a child from a subsequent revision. As shown above, the child canonical representation is "8a8b14." By querying the data structure(s) for "8a8b14," an example system may return results indicating an elimination of "8a8b14" at snapshot S10 as shown in FIG. 17B (1755), and FIG. 18 (1875). The time of snapshot S10 may be determined to be the elimination time from the code base of the coding defect represented by the violation with the canonical representation of "3a8d71." The system may also use the found snapshot to determine attribution for the removal of the coding defect (2060). In some instances, there may be several branches of a code base in a revision control system. If a coding defect is introduced in a parent branch and the code is subsequently split into three branches, there may be three child branch paths in which the coding defect could and should be eliminated. Branches allow for parts of software to be developed in parallel. Thus, revisions can be associated with one branch path of the code and not others. Since branches represent parallel versions of the code at a given time, a coding defect may be eliminated from one branch and yet still exist in the others. Therefore, it is possible for a coding defect introduced in a parent branch to have multiple child branch path elimination snapshots and canonical representations.

Figure 21:
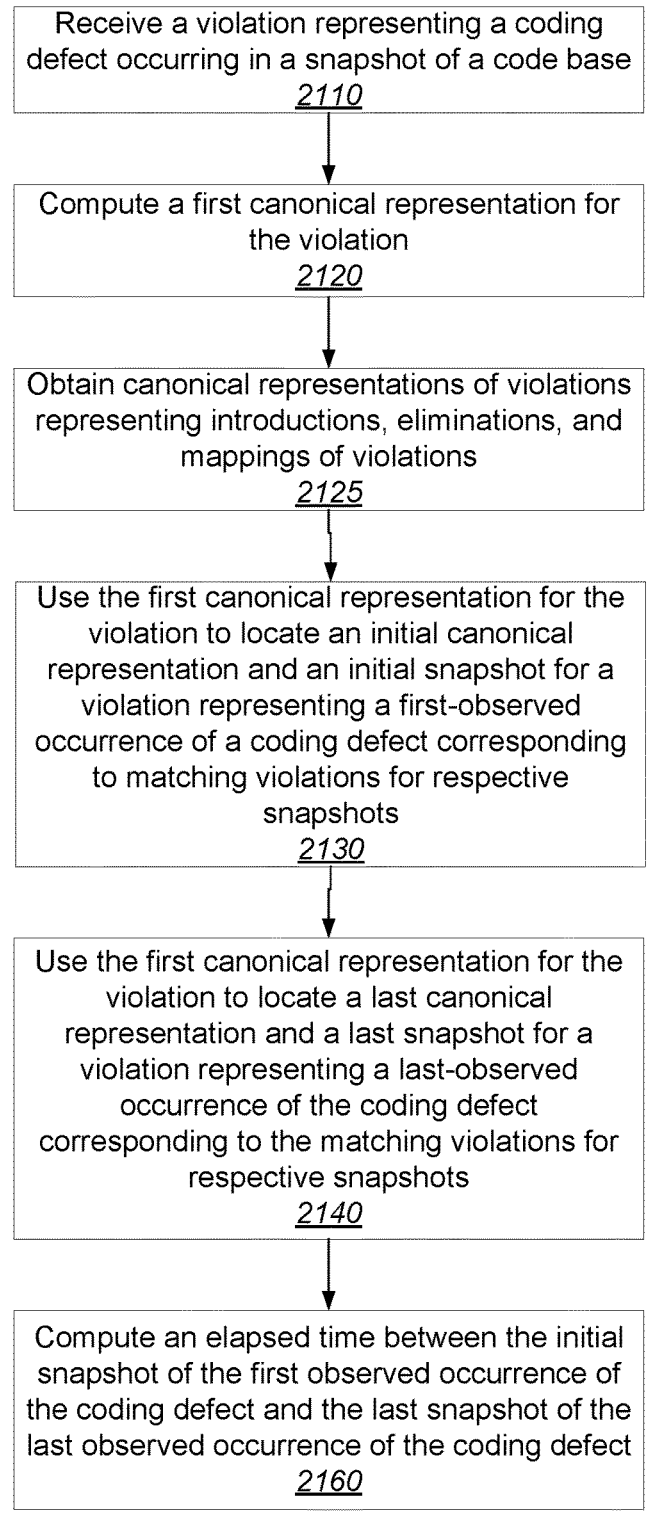
FIG. 21 is a flowchart of an example process for computing an elapsed time a coding defect represented by a violation has existed in the system using the violation's canonical representation.

FIG. 21 is a flowchart of an example process for computing an elapsed time that a coding defect, represented by a violation, has been in the system using the violation's canonical representation. Computing an elapsed time of a coding defect using canonical representations is merely an example of the attributes that can be computed using violations' canonical representations. As discussed above, an applications engine may receive violation status changes 125 and store change information in one or more persistent storage data structures. This stored information can be used to quickly analyze violations in the static analysis system.

The system receives a violation representing a coding defect occurring in a snapshot of a code base (2110). The system computes a canonical representation for the violation (2120). The system uses this canonical representation to determine when the coding defect represented by the violation was first-observed in the code base (2130) and/or when the coding defect was last observed in the code base (2140), even though the coding defect may correspond to many matching violations from many different snapshots. To determine the first and last occurrences of the coding defect, an example system queries the data structure(s) for the canonical representation of the violation and follows the processes described above. An example system uses the canonical representation to locate an initial canonical representation along with the initial canonical representation's snapshot for a violation representing a first-observed occurrence of the coding defect. Additionally, the example system uses this canonical representation to locate a last canonical representation along with the last canonical representation's associated snapshot for a violation representing a last-observed occurrence of the coding defect. An example system then computes an elapsed time the coding defect has been in the code base by subtracting the initial canonical representation's associated snapshot time from the last canonical representation's associated snapshot time (2160). As discussed earlier, there may be multiple elimination times due to branching in the code. An example system calculates the elapsed time for each branch in the same way, by finding the introduction snapshot time and subtracting it from the last-observed snapshot time in each branch. An example system provides the pathway for each branch from the parent introduction snapshot to the child elimination snapshot so that the time that the coding defect existed in each branch can be determined and analyzed. If a violation is fixed in different branches, there may be several interesting elapsed times for the violation. For example, one interesting elapsed time may be when the coding defect represented by the violation was first fixed in a branch, another interesting elapsed time may be when the coding defect represented by the violation was fixed in all branches, and a third interesting elapsed time may be the time between when the coding defect represented by the violation was first fixed and when the coding defect was fixed in all branches.

In some implementations, computing the elapsed time may be straight forward because there may be no mappings of canonical representations for a coding defect or branches of the code base. For example, a coding defect represented by a violation with a canonical representation of "7a8b11:0" may be received by the system for static analysis. An example system may query the violation status change database(s) for the canonical representation "7a8b11:0." This query may result in two rows being returned, one indicating that "7a8b11:0" was introduced in snapshot S1 as shown in FIG. 17A (1710) and FIG. 18 (1800) and one indicating that "7a8b11:0" was eliminated in snapshot S3 as shown in FIG. 17B (1705) and FIG. 18 (1825). An example system may merely compute an elapsed time between snapshot S3 and S1 in order to determine the time a coding defect represented by the violation with the canonical representation "7a8b11:0" existed in the database.

There may be some instances in which a coding defect still exists in a code base. An example system may handle these instances by using the time of the current snapshot as the last-observed occurrence of the coding defect. Alternatively, an example system may assume that the coding defect exists in the code base even now and may therefore use the current time as the last-observed time of the coding defect. For example, a system may receive a violation with a canonical representation "8e5c23" for which to perform static analysis. By querying a violation status change data structure(s), an example system may determine that the coding defect represented by a violation with a canonical representation "8e5c23" was introduced in snapshot S3 as shown in FIG. 17A (1740) and FIG. 18 (1815). However, there may be no mapping data associated with this canonical representation and no elimination data. An example system may determine the most recent snapshot as snapshot S13 for example. The system may then use the time associated with this snapshot S13 to determine the elapsed time the coding defect has existed in the system. Alternatively, the system may use the current time as the most recent time that the coding defect existed in the system and determine the elapsed time using this time. If the code base has been branched in a version control system resulting in three branches of the code each with the coding defect represented by the violation with a canonical representation "8e5c23," an example system may determine the last snapshot in each branch, for example S131, S132, and S 133. The system may then use the time associated with the last snapshots of each branch to determine the elapsed time the coding defect has existed in each branch. An example system may provide the elapsed time along with the branch pathway for each branch.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a computer-implemented method comprising:
   receiving a child snapshot, the child snapshot representing a code base at a specific revision;
   identifying a parent snapshot that represents a previous revision of the code base;
   computing canonical representations for violations representing coding defects in the parent and child snapshots;
   determining matching violations between the parent and child snapshots, unmatched parent violations occurring only in the parent snapshot, and unmatched child violations occurring only in the child snapshots, unmatched parent violations occurring only in the parent snapshot, and unmatched child violations occurring only in the child snapshot;
   for matching violations that have different canonical representations, storing a mapping between the parent snapshot violation and the child snapshot violation using their respective canonical representations;
   for each unmatched parent violation in the parent snapshot, storing the canonical representation of the violation with an indication that the violation has been eliminated from the child snapshot; and
   for each unmatched parent violation in the parent snapshot, storing the canonical representation of the violation with an indication that the violation has been introduced in the child snapshot.

Embodiment 2 is the computer-implemented method of embodiment 1, wherein the canonical representation is a stable location identifier.

Embodiment 3 is the computer-implemented method of embodiment 1, wherein storing the canonical representation of the violation with an indication that the violation has been eliminated from the child snapshot includes storing the canonical representation of the violation and the snapshot in a violation elimination data structure.

Embodiment 4 is the computer-implemented method of embodiment 1, wherein storing the canonical representation of the violation with an indication that the violation has been eliminated from the child snapshot includes storing the canonical representation of the violation, a reference to the child snapshot, and a status indicative of elimination in a violation status change data structure.

Embodiment 5 is the computer-implemented method of embodiment 1, wherein storing the canonical representation of the violation with an indication that the violation has been introduced by the child snapshot includes storing the canonical representation of the violation and a reference to the child snapshot in a violation introduction data structure.

Embodiment 6 is the computer-implemented method of embodiment 1, wherein storing the canonical representation of the violation with an indication that the violation has been introduced by the child snapshot includes storing the canonical representation of the violation, a reference to the child snapshot, and a status indicative of introduction in a violation status change data structure.

Embodiment 7 is the computer-implemented method of embodiment 1, wherein storing a mapping between the parent snapshot violation and the child snapshot violation using their respective canonical representations includes storing the mapping in a violation mapping data structure.

Embodiment 8 is the computer-implemented method of embodiment 1, wherein storing a mapping between the parent snapshot violation and the child snapshot violation using their respective canonical representations includes storing the mapping in a violation status change data structure with a status indicative of mapping.

Embodiment 9 is the computer-implemented method of embodiments 7 or 8 wherein storing a mapping between the parent snapshot violation and the child snapshot violation using their respective canonical representations includes: determining whether the data structure contains a mapping of the canonical representation of the parent snapshot violation and responsive to determining that the data structure contains a mapping of the canonical representation of the parent snapshot violation, appending the canonical representation of the child snapshot to the mapping.

Embodiment 10 is a computer-implemented method for computing an elapsed time a coding defect was present in a code base comprising:
  receiving a violation representing a coding defect occurring in a snapshot of a code base;
  computing a first canonical representation for the received violation;
  obtaining a plurality of canonical representations of violations representing introductions, eliminations, and mappings of violations in the code base;
  using the first canonical representation to locate an initial canonical representation and an initial snapshot for a violation representing a first-observed occurrence of a coding defect corresponding to a plurality of matching violations for a plurality of respective snapshots;
  using the first canonical representation to locate a last canonical representation and last snapshot for a violation representing a last-observed occurrence of the coding defect corresponding to the plurality of matching violations for the plurality of respective snapshots; and
  computing an elapsed time between the initial snapshot and the last snapshot.

Embodiment 11 is the computer-implemented method of claim 10, wherein using the first canonical representation to locate the initial canonical representation and initial snapshot comprises determining that the first canonical representation occurs in the set of canonical representations representing violation introductions.

Embodiment 12 is the computer-implemented method of embodiment 10, wherein using the first canonical representation to locate the last canonical representation and the last snapshot comprises determining that the first canonical location occurs in the set of canonical representations representing violation removals.

Embodiment 13 is the computer-implemented method of embodiment 10, wherein using the first canonical representation to locate the last canonical representation and the last snapshot comprises:
  determining that the first canonical location does not occur in the set of canonical representations representing violation removals;
  determining that the first canonical location does not map to any canonical representations that represent violation removals; and
  determining that the last snapshot is the last snapshot checked into a version control repository that contains the code base.

Embodiment 14 is the computer-implemented method of embodiment 10, wherein using the first canonical representation to locate the last canonical representation and last snapshot comprises:
  determining that the first canonical representation occurs in a set of mappings among canonical representations;
  obtaining a second canonical representation from a mapping to the first canonical representation in the set of mappings; and
  determining that the second canonical representation occurs in the set of canonical representations representing violation removals.

Embodiment 15 is the computer-implemented method of embodiment 10, wherein using the first canonical representation to locate the initial canonical representation and the initial snapshot comprises:
  determining that the first canonical representation occurs in a set of mappings among canonical representations;
  obtaining a second canonical representation from a mapping to the first canonical representation in the set of mappings; and
  determining that the second canonical representation occurs in the set of canonical representations representing violation introductions.

Embodiment 16 is the computer-implemented method of embodiment 10, wherein a canonical representation is a stable location identifier.

Embodiment 17 is a computer-implemented method comprising:
  receiving data representing a plurality of violations that match each other in respective snapshots of a code base;
  computing respective canonical representations for the plurality of violations; and
  representing the plurality of violations that match each other using a single instance of the canonical representation in association with a snapshot in which a coding defect represented by the plurality of violations was first observed.

Embodiment 18 is the computer-implemented method of embodiment 17, further comprising identifying pairs of violations that match each other without storing information.

Embodiment 19 is the computer-implemented method of embodiment 17, wherein every violation of the plurality of violations have identical canonical representations.

Embodiment 20 is the computer-implemented method of embodiment 17, further comprising storing a last instance of the representative canonical representation in association with an identifier for a snapshot in which a coding defect represented by the plurality of violations was last observed.

Embodiment 21 is the computer-implemented method of embodiment 17, further comprising storing a mapping between the respective canonical representations for pairs of matching violations that do not have matching canonical representations.

Embodiment 22 is the computer-implemented method of embodiment 17, further comprising storing the single instance of the canonical representation in association with a snapshot in which a coding defect represented by the plurality of violations was first observed.

Embodiment 23 is the computer-implemented method of embodiment 17, wherein the canonical representation is a stable location identifier.

Embodiment 24 is a computer-implemented method comprising:
receiving a violation representing a coding defect occurring in a snapshot of the code base;
computing a first canonical representation for the violation;
obtaining canonical representations of violations representing introductions and mappings of violations;
using the first canonical representation for the violation to locate an initial canonical representation and an initial snapshot for a violation representing a first-observed occurrence of a coding defect corresponding to matching violations for respective snapshots; and
attributing a violation introduction using the initial canonical representation and the initial snapshot.

Embodiment 25 is a computer-implemented method comprising:
receiving a violation representing a coding defect occurring in a snapshot of the code base;
computing a first canonical representation for the violation;
obtaining canonical representations of violations representing eliminations and mappings of violations;
using the first canonical representation for the violation to locate a last canonical representation and a last snapshot for the violation representing a last-observed occurrence of the coding defect corresponding to matching violations for respective snapshots; and
attributing the violation elimination using the last canonical representation and the last snapshot.

Embodiment 26 is a system comprising: one or more computers and one or more storage devices storing instructions that are operable, when executed by the one or more computers, to cause the one or more computers to perform the method of any one of embodiments 1 to 25.

Embodiment 27 is a computer storage medium encoded with a computer program, the program comprising instructions that are operable, when executed by data processing apparatus, to cause the data processing apparatus to perform the method of any one of embodiments 1 to 25.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a child snapshot, the child snapshot representing a code base at a specific revision;
identifying a parent snapshot that represents a previous revision of the code base;
computing canonical representations for violations representing coding defects in the parent and child snapshots;
determining matching violations between the parent and child snapshots, unmatched parent violations occurring only in the parent snapshot, and unmatched child violations occurring only in the child snapshot;
for matching violations that have different canonical representations, storing a mapping between the parent snapshot violation and the child snapshot violation using their respective canonical representations;
for each unmatched parent violation in the parent snapshot, storing the violation's canonical representation with an indication that the violation has been eliminated from the child snapshot; and
for each unmatched child violation in the child snapshot, storing the violation's canonical representation with an indication that the violation has been introduced in the child snapshot.

2. The computer-implemented method of claim 1, wherein the canonical representation is a stable location identifier.

3. The computer-implemented method of claim 1, wherein storing the violation's canonical representation with an indication that the violation has been eliminated from the child snapshot includes storing the violation's canonical representation and the snapshot in a violation elimination data structure.

4. The computer-implemented method of claim 1, wherein storing the violation's canonical representation with an indication that the violation has been eliminated from the child snapshot includes storing the violation's canonical representation, a reference to the child snapshot, and a status indicative of elimination in a violation status change data structure.

5. The computer-implemented method of claim 1, wherein storing the violation's canonical representation with an indication that the violation has been introduced by the child snapshot includes storing the violation's canonical representation and a reference to the child snapshot in a violation introduction data structure.

6. The computer-implemented method of claim 1, wherein storing the violation's canonical representation with an indication that the violation has been introduced by the child snapshot includes storing the violation's canonical representation, a reference to the child snapshot, and a status indicative of introduction in a violation status change data structure.

7. The computer-implemented method of claim 1, wherein storing a mapping between the parent snapshot violation and the child snapshot violation using their respective canonical representations includes storing the mapping in a violation mapping data structure.

8. The computer-implemented method of claim 1, wherein storing a mapping between the parent snapshot violation and the child snapshot violation using their respective canonical representations includes storing the mapping in a violation status change data structure with a status indicative of mapping.

9. The computer-implemented method of claim 7 or 8 wherein storing a mapping between the parent snapshot violation and the child snapshot violation using their respective canonical representations includes:
  - determining whether the data structure contains a mapping of the parent snapshot violation's canonical representation; and
  - responsive to determining that the data structure contains a mapping of the parent snapshot violation's canonical representation, appending the child snapshot violation's canonical representation to the mapping.

10. A system comprising:
  - one or more computers; and
  - one or more storage devices storing instructions that are operable, when executed by one or more computers, to cause the one or more computers to perform operations comprising:
    - receiving a child snapshot, the child snapshot representing a code base at a specific revision;
    - identifying a parent snapshot that represents a previous revision of the code base;
    - computing canonical representations for violations representing coding defects in the parent and child snapshots;
    - determining matching violations between the parent and child snapshots, unmatched parent violations occurring only in the parent snapshot, and unmatched child violations occurring only in the child snapshot;
    - for matching violations that have different canonical representations, storing a mapping between the parent snapshot violation and the child snapshot violation using their respective canonical representations;
    - for each unmatched parent violation in the parent snapshot, storing the violation's canonical representation with an indication that the violation has been eliminated from the child snapshot; and
    - for each unmatched child violation in the child snapshot, storing the violation's canonical representation with an indication that the violation has been introduced in the child snapshot.

11. The system of claim 10, wherein the canonical representation is a stable location identifier.

12. The system of claim 10, wherein storing the violation's canonical representation with an indication that the violation has been eliminated from the child snapshot includes storing the violation's canonical representation and the snapshot in a violation elimination data structure.

13. The system of claim 10, wherein storing the violation's canonical representation with an indication that the violation has been eliminated from the child snapshot includes storing the violation's canonical representation, a reference to the child snapshot, and a status indicative of elimination in a violation status change data structure.

14. The system of claim 10, wherein storing the violation's canonical representation with an indication that the violation has been introduced by the child snapshot includes storing the violation's canonical representation and a reference to the child snapshot in a violation introduction data structure.

15. The system of claim 10, wherein storing the violation's canonical representation with an indication that the violation has been introduced by the child snapshot includes storing the violation's canonical representation, a reference to the child snapshot, and a status indicative of introduction in a violation status change data structure.

16. The system of claim 10, wherein storing a mapping between the parent snapshot violation and the child snapshot violation using their respective canonical representations includes storing the mapping in a violation mapping data structure.

17. The system of claim 10, wherein storing a mapping between the parent snapshot violation and the child snapshot violation using their respective canonical representations includes storing the mapping in a violation status change data structure with a status indicative of mapping.

18. The system of claim 16 wherein storing a mapping between the parent snapshot violation and the child snapshot violation using their respective canonical representations includes:
  - determining whether the data structure contains a mapping of the parent snapshot violation's canonical representation; and
  - responsive to determining that the data structure contains a mapping of the parent snapshot violation's canonical representation, appending the child snapshot violation's canonical representation to the mapping.

19. A computer program product, encoded on one or more non-transitory computer storage media, comprising instructions that when executed by one or more computers cause the one or more computers to perform operations comprising:
  - receiving a child snapshot, the child snapshot representing a code base at a specific revision;
  - identifying a parent snapshot that represents a previous revision of the code base;
  - computing canonical representations for violations representing coding defects in the parent and child snapshots;
  - determining matching violations between the parent and child snapshots, unmatched parent violations occurring only in the parent snapshot, and unmatched child violations occurring only in the child snapshot;
  - for matching violations that have different canonical representations, storing a mapping between the parent snapshot violation and the child snapshot violation using their respective canonical representations;
  - for each unmatched parent violation in the parent snapshot, storing the violation's canonical representation with an indication that the violation has been eliminated from the child snapshot; and
  - for each unmatched child violation in the child snapshot, storing the violation's canonical representation with an indication that the violation has been introduced in the child snapshot.

20. The computer program product of claim 19, wherein the canonical representation is a stable location identifier.

21. The computer program product of claim 19, wherein storing the violation's canonical representation with an indication that the violation has been eliminated from the child snapshot includes storing the violation's canonical representation and the snapshot in a violation elimination data structure.

22. The computer program product of claim 19, wherein storing the violation's canonical representation with an indication that the violation has been eliminated from the child snapshot includes storing the violation's canonical representation, a reference to the child snapshot, and a status indicative of elimination in a violation status change data structure.

23. The computer program product of claim 19, wherein storing the violation's canonical representation with an indication that the violation has been introduced by the child snapshot includes storing the violation's canonical representation and a reference to the child snapshot in a violation introduction data structure.

24. The computer program product of claim 19, wherein storing the violation's canonical representation with an indication that the violation has been introduced by the child snapshot includes storing the violation's canonical representation, a reference to the child snapshot, and a status indicative of introduction in a violation status change data structure.

25. The computer program product of claim 19, wherein storing a mapping between the parent snapshot violation and the child snapshot violation using their respective canonical representations includes storing the mapping in a violation mapping data structure.

26. The computer program product of claim 25, wherein storing a mapping between the parent snapshot violation and the child snapshot violation using their respective canonical representations includes:
    determining whether the data structure contains a mapping of the parent snapshot violation's canonical representation; and
    responsive to determining that the data structure contains a mapping of the parent snapshot violation's canonical representation, appending the child snapshot violation's canonical representation to the mapping.

27. The computer program product of claim 19, wherein storing a mapping between the parent snapshot violation and the child snapshot violation using their respective canonical representations includes storing the mapping in a violation status change data structure with a status indicative of mapping.

* * * * *